(12) United States Patent
Holbek

(10) Patent No.: US 6,866,709 B1
(45) Date of Patent: Mar. 15, 2005

(54) BINDER SYSTEMS DERIVED FROM AMORPHOUS SILICA AND BASES

(75) Inventor: Kjeld Holbek, Roskilde (DK)

(73) Assignee: Aalborg Universitet, Aalborg (DE)

( * ) Notice: Subject to any disclaimer, the term of this patent is extended or adjusted under 35 U.S.C. 154(b) by 0 days.

(21) Appl. No.: 09/830,701

(22) PCT Filed: Oct. 29, 1999

(86) PCT No.: PCT/DK99/00588
§ 371 (c)(1),
(2), (4) Date: Apr. 30, 2001

(87) PCT Pub. No.: WO00/26154
PCT Pub. Date: May 11, 2000

(30) Foreign Application Priority Data

Oct. 30, 1998 (DK) .................................. 1998 01400

(51) Int. Cl.$^7$ ............................................. C04B 14/04
(52) U.S. Cl. ....................... 106/38.3; 106/600; 106/602; 106/644; 106/711; 501/80
(58) Field of Search ................................ 106/38.3, 600, 106/602, 644, 711; 501/80; 423/335

(56) References Cited

U.S. PATENT DOCUMENTS

| | | | | |
|---|---|---|---|---|
| 3,920,578 A | * | 11/1975 | Yates | |
| 3,977,888 A | * | 8/1976 | Sano et al. | |
| 4,162,238 A | * | 7/1979 | Bergna | .................... 106/38.35 |
| 4,472,201 A | * | 9/1984 | Ochi et al. | |
| 4,640,715 A | * | 2/1987 | Heitzmann et al. | |
| 4,642,137 A | * | 2/1987 | Heitzmann et al. | |
| 4,950,627 A | * | 8/1990 | Tokarz et al. | |
| 5,164,003 A | * | 11/1992 | Bosco et al. | .............. 106/287.1 |
| 5,194,087 A | * | 3/1993 | Berg | ........................... 501/108 |
| 5,584,921 A | * | 12/1996 | Wagner et al. | ........... 106/287.1 |
| 5,743,953 A | * | 4/1998 | Twardowska et al. | ...... 106/600 |
| 5,998,525 A | * | 12/1999 | Wang et al. | ................. 524/425 |

FOREIGN PATENT DOCUMENTS

| | | |
|---|---|---|
| EP | A1375235 | 6/1990 |
| JP | 59203738 | 11/1984 |
| JP | 60155763 | 8/1985 |
| ZM | 9101688 | * 12/1991 |

* cited by examiner

Primary Examiner—Paul Marcantoni
(74) Attorney, Agent, or Firm—Birch, Stewart, Kolasch & Birch, LLP

(57) ABSTRACT

The present invention relates to compositions comprising the reaction product of amorphous silica or ultra-fine silica and one or more bases. The present invention also relates to materials and method involving the use of such products. In particular, the present invention i.a. relates to new mineral wool products, e.g. products comprising man-made vitreous fibres (such as glass fibres, slag fibres, stone fibres and rock fibres) or perlite, having included therein a binder component which comprises amorphous silica and aklali metal organosiliconates, e.g. potassium methyl siliconate. An important feature of such products is the preparation of the binder systems under vigorous mixing. Such products provide good fire, heat and sound insulating properties. The present invention also provides to a method for removing odorous substances from a gas where materials prepared from ultra-fine silica, water, and one or more components enabling porosity-conferring binding of the material, e.g. a base or bases. Furthermore, the invention provides methods for thixotroping bitumen.

13 Claims, 1 Drawing Sheet

BINDER SYSTEMS DERIVED FROM AMORPHOUS SILICA AND BASES

Figure 1:
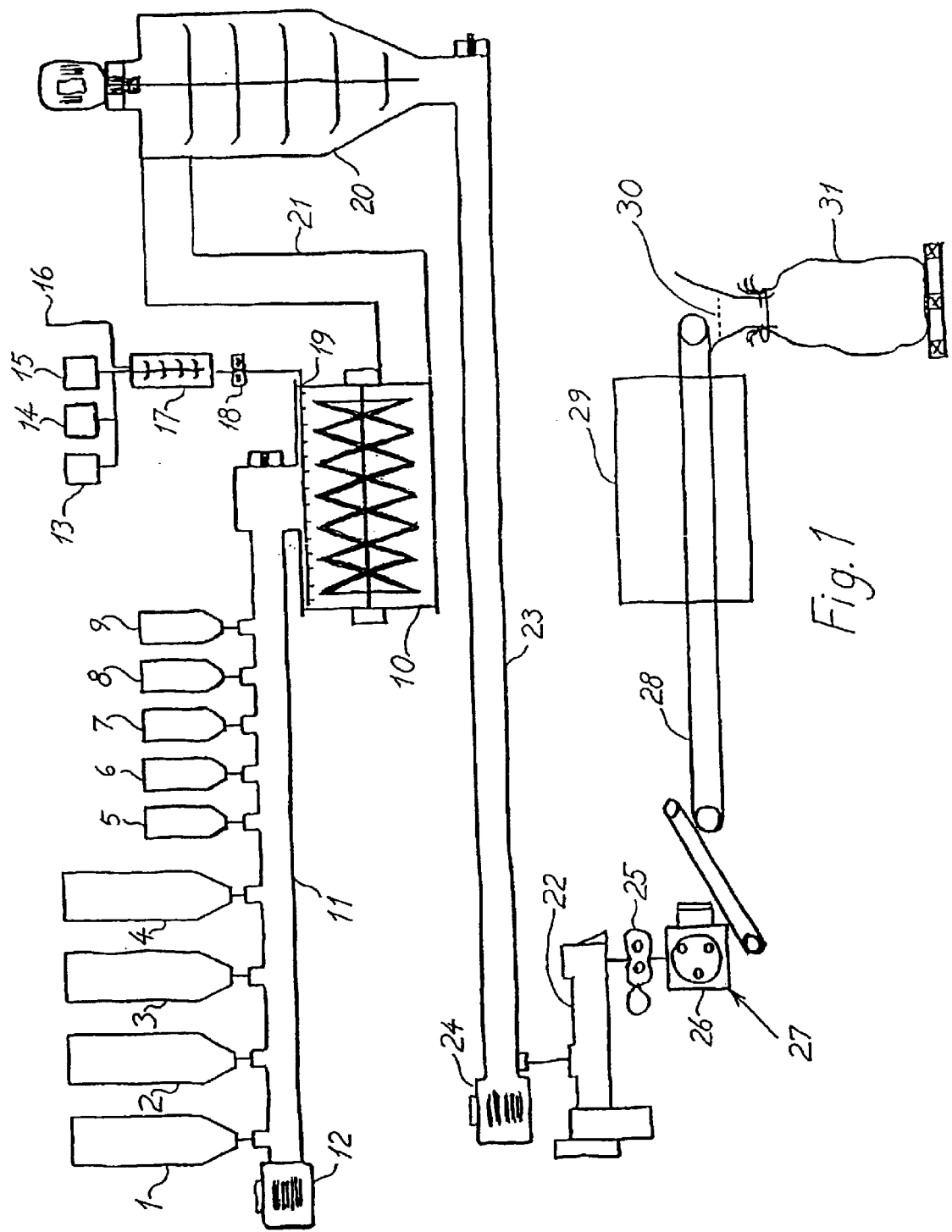

This application is the national phase under 35 U.S.C. §371 of PCT International Application No. PCT/DK99/00588 which has an International filing date of Oct. 29, 1999, which designated the United States of America.

FIELD OF THE INVENTION

The present invention relates to compositions comprising the reaction product of amorphous silica or ultra-fine silica and one or more bases. The present invention also relates to materials and method involving the use of such products.

In particular, the present invention i.a. relates to new mineral wool products, e.g. products comprising man-made vitreous fibres (such as glass, slag, stone and rock fibres), having included therein a binder component which comprises amorphous silica and alkali metal organosiliconates. The present invention also relates to the binder systems as such.

Furthermore, the present invention relates to a method for removing odorous substances from a gas where materials prepared from ultra-fine silica, water, and one or more components enabling porosity-conferring binding of the material, e.g. a base or bases.

BACKGROUND OF THE INVENTION

In the field of mineral wool product there has been an increasing interest in replacing organic binders such as phenol formaldehyde binders. Organic binders may however be inflammable. Thus, there is a desire for new essentially fire-proof binder systems for mineral fibre products.

JP 51 075 732 (WPI Derwent Abstract No. 76-62407x) relates to a corrosion protecting agent. Powdered zinc is mixed with a binder consisting of silica colloid and a water-soluble metal organosiliconate, e.g. sodium methyl siliconate, sodium ethyl siliconate or sodium phenyl siliconate, etc.

RU 2 057 098 (WPI Derwent Abstract No. 96-517000) relates to a mixture for surface coating of concrete, which comprises cement, a mineral filler, micro-silica, a superplasticiser, a moisture repelling organic silicon fluid based on sodium siliconates and poly-hydrosiloxanes, and water.

RU 2 014 306 (WPI Derwent Abstract No. 95-036343) relates to a composition comprising a gypsum-cement-pozzuolana binder, perlite hydrophobised with sodium methyl siliconate, glass fibres, and water for use as heat- and sound-insulating articles. The composition comprise a small amount of milled glass fibres.

DESCRIPTION OF THE INVENTION

Binder Systems Comprising Amorphous Silica and One or More Bases, Preferably Alkali Metal Organosiliconate The present invention i.a. provides new and advantageous mineral fibre/particles products based on an interesting binder system including a large amount of an amorphous silica.

All percentages are in percent by weight, unless otherwise stated.

Thus, the present invention provides an water-based binder system being derived from amorphous silica, one or more bases, and optionally additives. Preferably, the binder system is derived from amorphous silica, at least one of (a) an alkali metal organosiliconate and (b) a base, and optionally additives.

In the presently most interesting variant, the binder system comprises an alkali metal organosiliconate as a mandatory constituent. Alternatively, the binder system comprises a base as a mandatory constituent. A number of relevant and interesting embodiments of the binder system of the present invention comprises an alkali metal organosiliconate as well as a base.

Where the binder system comprises an alkali metal organosiliconate as a mandatory constituent, the weight ratio between the amorphous silica and the organosiliconate(s) in the binder system is preferably in the range of 99:1 to 75:25.

A number of different well-known materials can constitute the amorphous silica part of the binder system. Industrially produced amorphous silicas can be divided into at least four groups: silica gel, colloidal silica, precipitated silica and pyrogenic silica. Examples of such silicas are Aerosil®, Ketjensil®, Carbosil®, Cabosil®, Elkem Microsilica®, etc. Furthermore, other relevant amorphous silicas are of natural origin among which puzzolanes, Fuller's Earth, bentonite, fly-ash, tuff, pimpstone, etc.

Typically, relevant amorphous silica materials are materials not exclusively being constituted by $SiO_2$. Thus, it is generally believed that a certain amount of other inorganic impurities may be acceptable for the purposes described herein. However, the amorphous silica should comprise at least 60%, such as at least 70%, preferably at least 80%, in particular 90%, by weight of $SiO_2$.

The amount of silica (solids) in the binder system is preferably at least 50%, such as 60–99%, e.g. 65–95%, in particular 70–95%, by weight of the non-aqueous constituents.

It is presently believed that one of the important properties of the silica to be used within the present invention is the particle size which preferably should be in the range of 0.001–20 $\mu$m, such as 0.01–0.5 $\mu$m, in particular 0.05–0.1 $\mu$m. It is also presently believed that the specific surface area of the silica should be in the range of 1–1500 $m^2/g$, such as 10–1000 $m^2/g$, typically 10–500 $m^2/g$, presently preferred 10–100 $m^2/g$.

It is presently contemplated that ground (non-amorphous) silica materials, e.g. ground sand, may be used as long analogous with amorphous silica as long as the specific surface of such materials is above 10 $m^2/g$.

The amorphous silica is preferably provided in the form of a slurry, in particular with due regard to the below-mentioned process for preparing the binder system. Slurries of silica to be used within the present invention should preferably comprise 20–80% by weight of silica.

The alkali metal organosiliconate is preferably selected from sodium and potassium salts of an organosiliconate selected from methyl siliconate, ethyl siliconate, propyl siliconate, butyl siliconate and phenyl siliconate, preferable potassium methyl siliconate.

When present, the amount of alkali metal organosiliconate (solids) is typically 1–25%, such as 2–20%, in particular 2–15%, by weight of the non-aqueous constituents.

The alkali metal organosiliconate is also often provided as an aqueous solution. The alkali metal organosiliconate content of such solutions is typically 1–80% such as 10–50%, preferably 20–45%, by weight. Examples of commercially available organosiliconates are Wacker BS-15 (42% aqueous solution of potassium methyl siliconate) and Wacker BS-20.

It should be understood that even though reference is made to "a" silica and "an" alkali metal organosiliconate, each of those components as well as the base (see below) may actually be constituted by two or more different products or starting material so as to form a mixture of the constituent in question which fulfils the requirements (amount, qualities, etc.) defined herein. Thus, the silica constituent may be formed by two different silica qualities having different particle size distributions and/or the base constituent may be formed by, e.g. a liquid and a solid base component (e.g. hydroxides and cements).

In the events where a base (other than the alkali metal organosiliconate) is included either as a mandatory or as an optional constituent, such a base is preferably selected from alkali or alkaline earth metal hydroxides, such as sodium hydroxide, potassium hydroxide, magnesium hydroxide, and calcium hydroxide, alkali or alkaline earth metal silicates, aluminium silicates, iron(II) and iron(III) silicates and mixtures thereof, alkali or alkaline earth metal pyrosilicates, aluminium pyrosilicates, iron(II) and iron(III) pyrosilicates and mixtures thereof, alkali or alkaline earth metal carbonates, alkali or alkaline earth metal bicarbonates, alkali or alkaline earth metal phosphates, alkali or alkaline earth metal pyrophosphates, ammonia, and organic amines, such as primary, secondary, and tertiary amines, e.g., methylamine, dimethylamine, trimethylamine, ethylamine, diethylamine, triethylamine, and anilines, such as aniline, methylaniline and dimethylaniline, and cements (alkaline cements), such as basic Portland cement, rapid Portland cement, high early strength Portland cement, sulphate resistant cement, low-alkali cement, low heat cement, white Portland cement, Portland blast furnace cement, Portland pozzolana cement, Hasle cement, ultra Cement and aluminate cement (high alumina cement) and combinations thereof. In particular, the base or bases is/are selected from alkali metal hydroxides, alkaline earth metal hydroxides and cements, preferably selected from sodium hydroxide, potassium hydroxide and calcium hydroxide. As can be seen from the examples, a combination of two or more bases can also be used, even with certain advantages.

When present, the amount of base is typically up to 39%, such as 1–33%, in particular 2–28%, by weight of the non-aqueous constituents.

When the base is cement, interesting foamy materials can be formed simply by mixing amorphous silica and cement slurries under vigorous mixing. The weight ratio between amorphous silica and cement is typically in the range of 80:20–50:50. Such products and their uses as insulating materials represent a further aspect of the present invention.

It is generally believed that the highest degree of hydrophobicity of the products of the present invention (see below) can be accomplished by using a larger amount of the alkali metal organosiliconate than the base, in particular when alkali metal organosiliconate is used alone. In the embodiments where a siliconate as well as a base is present, the weight ratio between alkali metal organosiliconate and base is preferably 10:1–1:10 such as 5:1–1:5.

The total amount of alkali metal organosiliconate and base will determine the degree of reaction of the amorphous silica. It is believed that advantageous properties—in particular with respect to the silica "egg" theory, vide infra—are obtained when the total amount of alkali metal organosiliconate and base it below the stoichiometric amount needed to react with all amorphous silica. It is believed that the stoichiometric ratio between amorphous silica and the total amount of alkali metal organosiliconate and base should be less than 1:1, such as in the range of 1:0.95–1:0.4, in particular 1:0.9–1:0.5.

It is presently believed that excess of the siliconate and the base (after reaction with the silica) should be avoided in order to avoid hygroscopic carbonates.

Furthermore, the mixture from which the binder system is derived may further comprise one or more additives (additional non-aqueous constituents). Such additives may be any other components used to modify the properties of the resulting binder system or of any products having the binder system included. Examples of additives are surfactants, small amounts of organic solvents (even though generally undesirable for health and safety reasons), accelerators and retarders (accelerators and retarders: only when the base is a cement), etc. Examples of surfactants are non-ionic, anionic, and cationic surfactants. Examples of suitable surfactants are e.g. anionic surfactants such as derivatives of fatty acids wherein the negative charge is provided by a free carboxyl group, a sulphonate group, or a phosphate group, and such anionic surfactants commonly used in rinse aids; non-ionic surfactants such as esters or partial esters of fatty acids with an aliphatic polyhydric alcohol such as e.g. ethylene glycol, glycerol, sorbitol, etc., and the polyoxyethylene and polyoxypropylene derivatives of these esters, and such non-ionic surfactants commonly used in rinse aids; cationic surfactants such as derivatives of fatty acids, wherein the positive charge is provided by one or more quaternary ammonium groups, and such cationic surfactants commonly used in detergents. Fatty acids typically contain from 6 to 22 carbon atoms; examples are caproic, octanoic, lauric, palmitic, stearic, linoleic, linolenic, olesteric, and oleic acid, etc. Examples of applicable accelerators are e.g. calcium formate, calcium chloride, alkali metal nitrates, and ammonium nitrates. Examples of suitable retarders are polyhydroxycabocide, and alkali or alkaline earth metal phosphates. Small amounts of solid constituents (preferably less than 5%) may also be used as additives; examples of such solid "additives" are ultra-fine fibres, flakes, mica, etc.

The total amount of additives is typically 0–10%, such as 0–5%, preferably 0–3%, by weight of the non-aqueous constituents. When present, the amount is typically at least 0.01% by weight of the non-aqueous constituents.

Such additives may be vigorously mixed together with the alkali metal organosiliconate and base or may be added after the vigorous mixing as a final conditioning of the binder system. It is presently preferred that any additives are added together with the siliconate and base before mixing of those.

In one particularly interesting embodiment, the mixture from which the binder is derived is an water-based mixture of amorphous silica, an alkali metal organosiliconate, optionally a base, and optionally additives, where the amorphous silica constitutes 60–99%, preferably 65–95%, in particular 70–95%, the organosiliconate constitutes 1–25%, preferably 2–20%, in particular 2–15%, the base constitutes 0–39%, preferably 1–33%, in particular 2–28%, and any additives constitutes a total of 0–10%, preferably 0–5%, in particular 0–3%, by weight of the non-aqueous constituents.

The present invention also provides a method for preparing a binder system as above, preferably a binder system derived from a mixture comprising amorphous silica, at least one of (a) an alkali metal organosiliconate and (b) a base, and optionally additives, the method comprising vigorously mixing an aqueous slurry of the amorphous silica with the at least one of (a) an alkali metal organosiliconate and (b) a base, and the optional additives, said mixture having an initial pH in the range of 11.5–14 and a final pH in the range of 7.5–11.0.

It is preferred that the vigorous mixing of silica, the at least one of (a) an alkali metal organosiliconate and (b) a base and the optional additives is performed using a high-speed mixer so as to obtain a substantially uniform mixture of reacted silica particles, said silica particles being at least partially, but not fully, reacted with the at least one of (a) an alkali metal organosiliconate and (b) a base.

By vigorous mixing is meant that the mixing is mechanical mixing with an applied energy of at least 0.001 kWh/kg binder system (including water), such as at least 0.005 kWh/kg binder system, e.g. in the range of 0.01–1 kWh/kg binder system. Preferably, mixing is completed within one hour, in particular within 15 min.

In the events where the binder system comprises an alkali metal organosiliconate as well as a base, it is possible to first mix the silica and the base under vigorous stirring and then afterwards add the siliconate. Alternatively, a part of the silica may be mixed with the base and another part of the silica may be mixed with the siliconate, both under vigorous stirring. It is contemplated that these modifications may provide various advantageous properties depending on the purpose of the binder system. In one variant, the silica is mixed with the base and is stored for 1–36 hours before addition of the amount of siliconate constituent. This allows for the preparation of a excellent binder system.

As should be understood that the remainder of the binder system is water. The above-mentioned amounts of non-aqueous constituents may be obtained directly by using the indicated amounts before mixing. Alternatively, the binder system may be diluted by addition of further water. Also, excess water may be removed after preparation, but before use of the binder system. It is preferred that the amount of non-aqueous constituents is in the range of 5–40% by weight, such as 7–30% by weight, of the water-based binder system.

Furthermore, it is also preferred that the viscosity of the resulting binder system—before application onto any mineral fibre and/or mineral particle material—is in the range of 1–500,000 cp, in particular in the range of 1–30,000, especially in the range of 10–30,000 so as to facilitate application of the binder, e.g. by spraying (typically requires a viscosity in the range of 1–10,000), brushing or dipping. A suitable viscosity may be obtained by addition of additional water before application, vide supra.

Also preferred are binder systems where the pH is in the range of 7.5–11.0. The pH value may be adjusted by dilution with water.

Without being bound to any specific theory, it is believed that the present invention is particularly interesting and relevant where the preparation of the binder system is conducted in such as way that the amorphous silica is only partially reacted and dissolved, i.e. so that the at least a part of the fine particles is unreacted after treatment with the alkali metal organosiliconate and/or base, although some of the smallest particles may be fully reacted. When view in another way, it is believed that the silica particles are partially reacted with the siliconate and/or base so as to have a sticky surface just as frog eggs. When applied to a batch of mineral fibres and/or mineral particles, it is believed that the silica "eggs" after curing will provide further stability to the fibre web or bundle, which will result in improved form-stability. The preliminary theory is supported by the fact that the results obtained when using a binder system prepared from silica and potassium hydroxide (stoichiometric ratio 1:<1) provides better results than a comparative binder system constituted by potassium water glass. This being said, a variant where the silica is fully dissolved is also contemplated within the present invention.

This suggested structure of the binder—which is normally applied to a mineral material in the form of a "solution" or probably rather as a "slurry"—has resulted in the remarkable advantages of the present binder system over previous binder systems used in connection with mineral fibres and mineral particles.

What appears to be a remarkable feature of the present invention is the fact that two non-film forming components (i.e. the siliconate and the silica slurry) are mixed to give a film-forming product (the binder).

According to the object of the present invention, the binder system is used in combination with mineral fibres and/or mineral particles. Mineral materials in the form of fibres or particles should be inorganic materials such as mineral fibres such as volcanic rock fibres, wollastonite fibres, montmorillonite fibres, tobermorite fibres, biotite fibres, atapulgite fibres, calcined bauxite fibres, etc., mineral wool, whiskers, sand, expanded clay, wollastonite, perlite, ceramic fibres, Leca®, any man-made vitreous fibre, glass fibres including micro glass fibres, Rockwool® fibres, processed mineral fibres from mineral wool, and also inorganic fillers such as crushed minerals or other fine-grained minerals.

Thus, the present invention also provides a mineral fibre/particle product comprising mineral fibres and/or particles and a binder system, said binder system being derived one or more bases, preferably from a mixture comprising amorphous silica and at least one of (a) an alkali metal organosiliconate and (b) a base, and optionally one or more additives. The binder system is essentially as described above.

It should be understood that the product may comprise mineral fibres, mineral particles as well as combinations of mineral fibres and mineral particles, thus the nomenclature fibre/particles. Preferably, the product is a mineral fibre product, in particular product comprising man-made vitreous fibres. A mineral fibre product may comprise a small proportion of particles, e.g. up to 15%, such as up to 10%, preferably up to 5%, by weight of particles, and vice versa for mineral particle products.

Consequently, the present invention also provides a method for preparing a mineral fibre/particle product, preferably a mineral wool product, comprising mineral fibres and/or mineral particles and a binder system, said binder system being derived from one or more bases, preferably from an aqueous mixture of amorphous silica, at least one of (a) an alkali metal organosiliconate and (b) a base, and optionally additives, the method comprising the step of:

preparing a binder system by mixing an aqueous slurry of the amorphous silica, with the one or more bases, preferably the at least one of (a) an alkali metal organosiliconate and (b) a base, and the optional additives, applying the binder system to the mineral fibres and/or mineral particles, and drying and curing the binder so as to obtain the mineral fibre/particle product.

Although mineral fibre products presently are the most interesting, mineral particle products based on perlite constitute a similarly interesting embodiment due to the excellent insulating properties, i.e. heat, sound, and fire insulating properties observed so far (see the examples). It is believed that compositions where the weight ratio between the binder system (solids) and perlite is in the range of 4:1–1:4 such as 4:1–1:3 are particularly interesting. The binder system is as defined and specified above.

The preparation of the binder system is accomplished as described above. The application of the binder system to the mineral fibres and/or particles can be accomplished by application means known to the person skilled in the art, e.g. by dipping, spraying, by means of a brush or a roller or a blade, etc.

The drying and curing step should always (as will be apparent to the person skilled in the art) be conducted with due regard to the nature of the constituents of the binder system and the mineral fibres/particle, however in the following will be given general guidelines for the drying and curing step. It should be noted that drying and curing is generally considered as one step as the drying (removal of water) will take place simultaneously with the curing, however as the curing typically will proceed more slowly in highly diluted systems, drying will be predominant in the initial phase of the drying and curing step and the curing will be predominant in the later phase of this step.

After application of the binder to the fibres/particles, the drying and curing is typically initiated by raising the temperature, e.g. by moderate heating to a temperature in the range of 30–60° C., such as, but not generally required, in an inert or low-reactive atmosphere, e.g. a dehumidified atmosphere. Subsequent heating to 60–200° C., such as 65–150° C., preferably 70–100° C., will lead to a rapid curing of the binder, e.g. curing within 0.5–10 min. It is recommended that the water content should be less than about 50% by weight of the binder system before the temperature is increased to above around 100° C. (local boiling temperature for water), this particularly applies where thick layers of binder is applied in order to avoid the formation of imperfection in the product due to chock boiling of the water.

In a preferred embodiment where mineral fibres (mineral wool) are used, the binder composition is preferably sprayed onto the fibres just after the spinning of the glass or the stone melt, preferably already in the spinning chamber. The curing of the binder composition proceeds by bringing the sprayed fibres in an oven. It is advantageous to remove some of the water originating from the binder mixture before curing. This may, e.g., be done under reduced pressure or in a de-humidified environment or by slow heating up to curing temperature. The curing temperature is normally in the range of 70–250° C., in particular in the range of 70–100° C. The sufficient curing time is normally in the range of 0.2–15 min. It is advantageous that the curing occurs in a $CO_2$ depleted environment so as to avoid hygroscopic carbonates.

In the mineral fibre (mineral wool) embodiment, the raw materials for the mineral fibres composition can be converted to a melt in the conventional manner, e.g. in a gas heated furnace or in an electric furnace or in a shaft or cupola furnace. The melt can be converted into fibres in conventional manners, e.g. by the spinning cup process or by the cascade rotor process such as described in WO 92/06047. In particular, the melt which is used for pouring onto the first rotor in order to form the fibres can be any convenient vitreous melt suitable for spinning by any spinner. Usually, such a melt is known as a stone, rock or slag melt. Man made vitreous fibres (MMVF) are made from vitreous melts, e.g., formed from a number of molten mineral materials such as one or more of diabase, basalt, slag, limestone, dolomite, cement, clay, feldspar, sand or olivin. As mentioned above, the melt is formed by melting in a furnace the mineral raw materials so as to obtain a desired analysis. Examples of MMVF which are durable in use but which have been shown to be biologically soluble are, e.g. described in EP 0 791 087 and EP 0 596 088.

The fibres can have any convenient fibre diameter and length. Generally the average fibre diameter is below 10 $\mu$m, e.g. 5 $\mu$m. Usually, a mineral fibre product contains 1–15 % by weight of binder, preferably 2–10% by weight. Usually, the binder is added to the fibres just after fiberasation of the melt.

Generally, the mineral fibre product is in the form of a slab, sheet or other shaped articles, e.g. pipes or pipe sections. A web of the thus formed materials can—before or after application of the binder—be converted into any desired final product by conventional techniques, e.g., by direct collection or by cross-lapping, and subsequent oven curing. The web may be formed into any conventional man-made vitreous fibre products such as heat insulation, fire protection, acoustic insulation and regulation, or horticultural growth media or fibres for reinforcement or as fillers. Examples hereof are sheets, e.g. sheets where the binder is unevenly distributed in volume of the sheet. In one interesting embodiment, at least a part of the outer surfaces of the sheet is treated with additional binder so as to provide modified properties of the product or in order to provide further fire protecting properties. This possibility also opens up for surface treatment of mineral wool sheets with smoother, user-friendlier surfaces. According to the possibility of modifying the hydrophobicity of the binder and thereby the product, it is also possible to modify the products so as to obtain either water repelling or water absorbing properties.

In general, the binder system of the present invention may be used either as replacement for or in combination with traditional phenol formaldehyde binders and mineral or silicone oils presently used in man-made vitreous fibre product. It is contemplated that a combination of the binder system of the present invention can be mixed with a conventional phenol formaldehyde binder or sprayed on top of such phenol formaldehyde binders as a supplement or alternative to mineral or silicone oils. Also, it is contemplated that the binder systems of the present invention may be mixed with mineral or silicone oils to provide excellent properties for mineral wool products, e.g. dust free, non-brittle, water non-absorbing, fire retarding products.

The products according to the present invention may have a vast range of applications, not only within the field of heat and fire insulating materials. Due to the hydrophobicity introduced with the binder system including alkali metal organosiliconates, the products may be used as hydrophobic filters or as catalyst carriers or for filters comprising catalysts.

Another application for the products is as filling materials for cavities of aluminium profiles used as construction and building materials, e.g. for window frames. The advantage is that the product can be based on inexpensive mineral fibre waste and cheap binder materials and provide hydrophobic, water-non-absorbing materials.

A further possibility within the present invention is raw materials for the production of mineral wool by mixing silica, alkali metal hydroxide, mineral wool waste and fly-ash.

The binder as such may be used as paint composition for concrete or bricks directly sprayable onto building material surfaces.

Furthermore, it is envisages that removal of water from a binder system solution/slurry, e.g. be dehumidifying the binder system to a water content of 20–30% by weight can provide a plastic material which can be formed (e.g. extruded) directly into interesting ceramic objects.

Porous Bodies Useful for Removing or Reducing the Content of Odorous Substances from a Gas A further aspect of the present invention relates to porous bodies useful for removing or reducing the content of odorous substances from a gas. It should be noted that the definitions given in the following (up to the Examples section) relates to this aspect.

During the last decades a large research effort has been devoted to the field of developing efficient adsorption agents. Nevertheless, the most commonly used adsorption agents are still activated carbon and silica gel and these adsorption agents are widely used within the chemical industries for removing toxic and odorous substances, for bleaching various oils, and for recovering of volatile organic solvents.

It is believed that two factors are responsible for an efficient adsorption of e.g. gas molecules to a solid surface.

First, the physical nature of the adsorption process is due to the so-called Van der Waal's forces which is dependent on the specific chemical nature of the adsorption agent and the adsorbent. Thus, the adsorption process is merely physical in nature and the adsorbed molecules are held loosely to the solid surface. This, in turn, has the consequence that the adsorbed molecules are easily "desorbed" e.g. by displacement or by applying heat to the system.

Secondly, the surface area of the adsorption agent plays a role in the efficiency of the adsorption process. Actually, the chemical nature of the surface is of minor significance and should be considered only secondary in relation to the major factor, i.e. the magnitude of the surface area.

The internal surface area and with it the porosity of the adsorption agent is therefore of major importance in developing new adsorption agents. The large internal surface area in e.g. activated carbon is made up by the micropore structure in the material.

If the chemical nature of the surface is regarded as playing a secondary role in adsorption, the adsorptive properties of a adsorption agent can be attributed mainly to the surface area and hence the pore structure. It is apparent from pore size distribution data that the major contribution to surface area is located in pores of molecular dimensions, i.e. pores with a typical diameter in the range from 10–1000 Å. Thus, a molecule will, due to steric effects, not readily penetrate into a pore smaller than a certain critical diameter and will be excluded from pores smaller than this.

The internal surface of activated carbon is usually in the range from 500–1400 $m^2/g$, i.e. the surface area may vary considerably depending on the specific product and how this product is manufactured. Silica gel, on the other hand, usually has a smaller internal surface in the range from 400–500 $m^2/g$.

Activated carbon, however, suffers from the disadvantage that the product is very dusty, thus causing problems in the working environment or when used in connection with electronic devices. Furthermore, for most practical applications of activated carbon as a filter material it is necessary to install filter bags in order to collect detached coal dust.

Thus, there is a need for materials which can be applied in adsorption and filter systems without the disadvantages associated with the use of activated carbon.

It has now surprisingly been found that a new method for removing odorous substances from a gas, e.g. air, can be based on filtering the gas in question through a porous and easily produced material.

The material through which the gas is passed through possesses good mechanical properties and due to its inorganic nature the material is inflammable. As will be apparent from the detailed description below, the material comprises mainly natural products which are very cheep indeed as well as environmental desirable. Another advantage is the extreme ease whereby such materials can be produced. Furthermore, the materials are easily stored and transported as no problems arise due to e.g. microbiological growth, swelling caused by water absorption, etc., and the materials are chemically inert and stable even at elevated temperatures.

Thus, the present invention relates to a method for removing or reducing the content of odorous substances from a gas such as air, comprising passing the gas containing odorous substances through a filter of a product comprising a porous body or porous bodies produced from a material made from components comprising ultra-fine silica, water, and one or more components enabling porosity-conferring binding of the material.

The present invention also relates to a method for producing bodies for use in the method for removing odorous substances from a gas such as air, comprising mixing ultra-fine silica, water, and one or more components enabling porosity-conferring binding of the resulting material, if necessary removing water from the resulting mixture, and converting the mixture to a body or bodies, the process being performed under conditions resulting in a specific surface of the body or bodies of at least 25 $m^2/g$.

In the present context, the term "odorous substances" are intended to mean substances with a distinctive smell, which smell it is desired to remove or reduce for comfort purposes or even for health purposes, which smell may originate, e.g., from petrol and petrol stations, households, bodies, cosmetics, hospitals, kitchens, e.g. foods such as fats, cheese, garlic, onions, fish, etc., warehouses, welding, tobacco, desinfectants, automobile exhaust gas, car parks, airports, asphalt fumes, burned flesh, burned food, citrus and other fruits, coal smoke, diesel fumes, essential oils, fertilisers, film processing, gasoline, incense, irritants, organic chemicals, packinghouses, paint and redecorating odours, perfumes, pitches, poison gases, pollen, poultry, resins, rubber, sewer odours, slaughtering, smog, sour milk, toilets, stomi bags varnish, drains, etc., or combinations thereof.

The term "odorous substances" further comprises single molecules giving rise to a distinctive smell such as acetaldehyde, acetic acid, acetic anhydride, acetone, acetylene, acrolein, acrylic acid, acrylonitrile, amines, ammonia, amyl acetate, amyl alcohol, amyl ether, aniline, benzene, borane, bromine, butadiene, butane, butanone, butyl acetate, butyl alcohol, 2-butoxyethanol, butyl chloride, butyl ether, butylene, butyraldehyde, butyric acid, camphor, caprylic acid, carbolic acid, carbon disulfide, carbon dioxide, carbon monoxide, carbon tetrachloride, cellosolve, cellosolve acetate, chlorine, chlorobenzene, chlorobutadiene, chloroform, chloronitropropane, chloropicrin, creosote, cresols, crotonaldehyde, cyclohexane, cyclohexanol, cyclohexanone, cyclohexene, decane, dibromoethane, dichlorobenzene, dichlorodifluoromethane, dichloroethane, dichloroethylene, dichloroethyl ether, dichloromonofluormethane, dichloronitroethane, dichloropropane, dichlorotetrafluoroethane, diethylamine, diethyl ketone, dimethylaniline, dimethylsulphate, dioxane, dipropyl ketone, ethane, ether, ethyl acetate, ethyl acrylate, ethyl alcohol, ethyl amine, ethyl benzene, ethyl bromide, ethyl chloride, ethyl ether, ethyl formate, ethyl mercaptan, ethyl silicate, ethylene, ethylene chlorhydrin, ethylene dichloride, ethylene oxide, eucalyptole, fluortrichloromethane, formaldehyde, formic acid, heptane, heptylene, hexane, hexylene, hexyne, hydrogen, hydrogen bromide, hydrogenchloride, hydrogen cyanide, hydrogen fluoride, hydrogen iodide, hydrogen selenide, hydrogen sulfide, indole, iodine, iodoform, isophorone, isoprene, isopropyl acetate, isopropyl alcohol, isopropyl chloride, isopropyl ether, kerosene, lactic acid, menthol, mercaptans, methane, methyl acetate, methyl acrylate, methyl alcohol, methyl bromide, methyl butyl ketone, methyl cellosolve, methyl cellosolve acetate, methyl chloride, methyl ether, methyl ethyl ketone, methyl formate, methyl isobutyl ketone, methyl mercaptan, methylcyclohexane, methylcyclohexanol, methylcyclohexanone, methylene chloride, monochlorobenzene, monofluorotrichloromethane, naphthalene, naphthziene, nicotine, nitric acid, nitro benzenes, nitroethane, nitrogen dioxide, nitroglycerine, nitromethane, nitropropane, nitrotoluene, nonane, octalene, octane, ozone, palmitic acid, paradichlorbenzene, pentane, pentanone, pentylene, pentyne, perchlorethylene, phenol, phosgene, propane, propionaldehyde, propionic acid, propyl acetate, propyl alcohol, propyl chloride, propyl ether, propyl mercaptan, propylene, propyne, putrescine, pyridine, styrene monomer, sulphur dioxide, sulphur trioxide, sulphuric acid, tetrachlorethane, tetrachloroethylene, toluene, toluidine, trichloethylene, trichlorethane, turpentine, urea, uric add, valeric acid, valeric aldehyde, xylenes, etc., and combinations thereof.

Normally, the method of the invention will reduce the content of the odorous substances to at the most 50% of its initial concentration, preferably to at the most 30% or better at the most 20%, such as at the most 10% or less. The reduction aimed at is often a substantially complete removal of the odorous substances.

The product for removing odorous substances according to the invention comprises a porous body or bodies produced from a material made from components comprising ultra-fine silica, water, one or more components enabling porosity-conferring binding of the material, and optionally filler bodies, porosity-enhancing bodies, and non-ionic, cationic, and/or anionic surfactants. The product may consist solely of the porous body or bodies, or the product may contain components in addition to the bodies, e.g., a structure, such as a grid or network or a component, such as an adhesive, keeping several bodies together in a random or ordered configuration.

In the present context the term "ultra-fine silica" is intended to designate $SiO_2$-rich particles having a specific surface of about 5 $m^2$/g to 200 $m^2$/g, especially about 10 $m^2$/g to 50 $m^2$/g. Such a product is produced as a by-product in the production of silicon metal in electrical furnaces and comprises particles in a particle-size range from about 50 Å to about 0.75 μm, typically in the range from about 200 Å to about 0.75 μm.

The porous bodies are then typically filled into cartridges by methods known to the person skilled in the art, e.g. by methods usually employed when filling active carbon into cartridges.

The component enabling porosity-conferring binding of the material from which the bodies are made so as to result in porous bodies may be a dispersed (in the form of particles or droplets) or dissolved reactant which is capable of reaction with the ultra-fine silica to result in a solid microstructure which is porous. The porous microstructure may be of a generally "sintered" character, where discernable particles of the ultra-fine silica and/or of the component in question are bound to each other in menisci of a solidified (precipitated) material, normally a material formed by the reaction between the ultra-fine silica and the component in question, or the porous microstructure may be a generally amorphous material or generally crystalline microstructure resulting from a reaction between the ultra-fine silica and the component in the aqueous phase and precipitation of the amorphous material.

Interesting examples of components enabling porosity-conferring binding are bases e.g. alkali or alkaline earth metal hydroxides, such as sodium hydroxide, potassium hydroxide, magnesium hydroxide, and calcium hydroxide, alkali or alkaline earth metal silicates, aluminium silicates, iron (in the oxidation state II or III) silicates, and mixtures thereof, alkali or alkaline earth metal pyrosilicates, aluminium pyrosilicates, iron (in the oxidation state II or III) pyrosilicates, and mixtures thereof, alkali or alkaline earth metal carbonates, alkali or alkaline earth metal bicarbonates, alkali or alkaline earth metal phosphates, alkali or alkaline earth metal pyrophosphates, perlite, ammonia, and organic amines, such as primary, secondary, and tertiary amines, e.g., methylamine, dimethylamine, trimethylamine, ethylamine, diethylamine, triethylamine, and anilines, such as aniline, methylaniline, dimethylaniline, etc., and cements, such as basic Portland cement, rapid Portland cement, high early strength Portland cement, sulphate resistant cement, low-alkali cement, low heat cement, white Portland cement, Portland blast furnace cement, Portland pozzolana cement, Hasle cement, ultra Cement and aluminate cement (high alumina cement) or combinations thereof.

Preferably the base is selected from cements, perlite, and alkali or alkaline earth metal hydroxides, especially calcium hydroxide.

Without being bound by a specific theory, it is believed that the components enabling porosity-conferring binding, such as bases, will often be components which react chemically with part of the silica, thereby creating "cavities" in the silica framework which in turn increase the surface area and with it the porosity of the resulting material.

In the present context the term "fibres" is intended to mean any fibres within the groups of natural inorganic fibres, synthetic inorganic fibres, natural organic fibres, synthetic organic fibres, and metallic fibres, or mixtures thereof, preferably inorganic or organic fibres or mixtures thereof. Furthermore, the term "fibres" is intended to cover monofilaments, split fibres, and stable fibres of any cross section. Thus, the term also comprises bands, granules, needles, whiskers, and strips. The fibres may or may not have been surface treated or coated.

Thus, in an interesting embodiment of the method according to the invention, the material through which the odorous substances are passed through also comprises one or more filler bodies such as fibres and particles. Preferred examples of fibres are silicon-containing fibres, metal fibres, oxide fibres, carbon fibres, glass fibres including micro glass fibres, Rockwool fibres, processed mineral fibres from mineral wool, volcanic rock fibres, wollastonite fibres, montmorillonite fibres, tobermorite fibres, biotite fibres, atapulgite fibres, calcined bauxite fibres, aromatic polyamide fibres, aromatic polyester fibres, aromatic polyimide fibres, cellulose fibres, cotton fibres, flax fibres, rubber fibres and fibres of derivatives of rubber, polyolefin fibres including polyethylene and polypropylene fibres, polyacetylene fibres, polyester fibres, acrylic fibres and modified acrylic fibres, acrylonitrile fibres, elastomeric fibres, protein fibres, alginate fibres, poly(ethylene terephthalate) fibres, polyvinyl alcohol fibres, aliphatic polyamide fibres, polyvinylchloride fibres, polyurethane fibres, vinyl polymeric fibres, and viscose fibres, modified by any chemical or physical processes, and any mixtures thereof.

Preferred fibres are micro glass fibres, Rockwool® fibres, wood fibres, plant fibres, polypropylene fibres and polyethylene fibres.

In a particular interesting embodiment of the invention the material through which the odorous substances are passed through comprises one or more filler bodies selected from cellulose fibres. Specific examples of cellulose fibres are for example cotton fibres, wheat fibres, agar fibres, flax fibres, pea fibres, barley firbres, oat fibres, cocoa fibres, coffee fibres, orange fibres, citrus fibres, apple fibres, tomato fibres, carrot fibres, soya fibres and acacia fibres. The presently most preferred cellulose fibres are fibres selected from example cotton fibres, wheat fibres and agar fibres.

In another interesting embodiment of the invention the cellulose fibres may be obtained from a paper source such as chopped newspapers, chopped virgin paper or paper which has been de-fibrated by means of a hammer mill.

As will be apparent from the examples provided herein chopped paper may be prepared by cross-cutting the paper in a shredding machine. Preferably the cross-cut paper has a length of 0.1 to 1 mm and a width of 0.4 to 0.9 mm.

It should be understood that the amount of cellulose fibres present in the porous material constitutes a compromise; the amount of cellulose fibres should one the one hand be as large as possible in order to increase the absorption properties of the porous material but, on the other hand, the amount of cellulose fibres should be as low as possible in order to prevent or reduce the inflammability of the porous material. It has been found by the present inventor that in order to obtain satisfactory absorption properties, the amount of cellulose fibres in the porous material will generally be in the interval from 4% to 75% by weight, preferably 10% to about 50% by weight, in particular from 15% to about 35% by weight.

It has been found, however, that it is possible to obtain satisfactory absorption properties of the porous material even when the amount of cellulose fibres are very low, i.e. in the range from 4% to 10% by weight, such as about 7% by weight. As explained above, the advantage of using such low amounts of cellulose fibres is that the porous material will not be inflammable.

Examples of suitable particles are particles which tend to be insoluble under the conditions prevailing during the reaction between the ultra-fine silica and the porosity-conferring component, e.g., fine (but not ultra-fine and not reactive) silica particles such as ground quarts and silica gel particles, other ground mineral particles such as heavy spar, bentonite, diatomite, dolomite, feldspar, kaolin, spherical and hollow particles, carbon particles, talc, mica, vermiculite, kiselguhr aluminium silicate, chalk, and fly ash etc. Especially interesting filler particles are porosity-enhancing bodies such as mica, chalk, vermiculite, or combinations thereof.

In another interesting embodiment of the method of the invention, the material from which the porous bodies are made may comprise one or more organic components such as straw, cellulose fibres, polymer fibres, textile fibres, cotton fibres, flax fibres, pulverised plant shells etc., so that when the porous bodies made from the material are incinerated, typically at a temperature around 700° C. in an inert atmosphere, the organic components will carbonise, i.e. the final porous bodies will be carrying elemental carbon on surfaces thereof, so as to establish an economical "supported" active carbon.

Furthermore, in some cases it may be advantageous to add surfactants to the reaction mixture. Thus, addition of non-ionic, anionic, and cationic surfactants to the reaction mixture may provide a more smooth processing (e.g. extrusion) of the material. However, the addition of surfactants to the reaction mixture is not presently preferred.

Examples of suitable surfactants are e.g. anionic surfactants such as derivatives of fatty acids wherein the negative charge is provided by a free carboxyl group, a sulphonate group, or a phosphate group, and such anionic surfactants commonly used in rinse aids; non-ionic surfactants such as esters or partial esters of fatty acids with an aliphatic polyhydric alcohol such as e.g. ethylene glycol, glycerol, sorbitol, etc., and the polyoxyethylene and polyoxypropylene derivatives of these esters, and such non-ionic surfactants commonly used in rinse aids; cationic surfactants such as derivatives of fatty acids, wherein the positive charge is provided by one or more quaternary ammonium groups, and such cationic surfactants commonly used in detergents. Fatty acids typically contain from 6 to 22 carbon atoms; examples are caproic, octanoic, lauric, palmitic, stearic, linoleic, linolenic, olesteric, and oleic acid, etc.

Various accelerators and retarders may optionally be added to the reaction mixture. Examples of suitable accelerators are e.g calcium formate, calcium chloride, alkali metal nitrates, and ammonium nitrates. Examples of suitable retarders are polyhydroxy-cabocide, and alkali or alkaline earth metal phosphates.

The porous materials should preferably have a bulk density in the range from about 300 $kg/m^3$ to about 700 $kg/m^3$. It has been found that porous materials having a bulk density below 300 $kg/m^3$ is too brittle and, consequently, not suitable for the purposes of the present invention. Preferably, the porous materials should have a bulk density which is below that of carbon, i.e. a the porous materials should preferably have a bulk density below 525–550 $kg/m^3$. It is contemplated that particularly interesting porous materials will have a bulk density in the range from 400 to 450 $kg/m^3$.

As will be understood from the examples provided herein, the porous bodies through which the odorous substances are passed are easily produced by a batch process. However, due to the simple production, the material through which the odorous substances are passed through may also be produced in a continuous process such as illustrated in FIG. 1 below.

As will be understood from the examples provided herein, one way of producing the material from which the porous bodies are made is by mixing ultra-fine silica, water and the component enabling porosity-conferring binding of the resulting material while stirring until a workable powder substance is formed, or at the most for 30 min., preferably for at the most 15 min.

When applying a strong base (such as e.g. lime water) the initial pH in the aqueous phase is usually at least 10, such as at least 10.5, preferably at least 11. In this specific case the reaction is preferably continued until the pH in the aqueous phase is at the most 9, or at the most a pH which will secure a specific surface area of at least 25 $m^2/g$, e.g. at least 50 $m^2/g$, such as at least 100 $m^2/g$, preferably at least 200 $m^2/g$, even more preferably at least 300 $m^2/g$, in particular at least 400 $m^2/g$, especially at least 500 $m^2/g$, such as at least 600 $m^2/g$.

Without being bound by a specific theory, it is believed that the above-mentioned pH-drop is provided by the excess of silica present in the reaction mixture. It is believed that the decrease in the pH is of outmost importance, and therefore, in another embodiment, wherein silica is not present in excess, the pH-drop may be provided by addition of acidic components to the reaction mixture, such as silica, mica, inorganic acids, such as hydrochloric acid, hydrobromic acid, sulphuric acid, nitric acid, etc. and organic acids, such as acetic acid, propionic acid, etc. and such acids as known to a person skilled in the art.

It will be understood from the examples provided herein that the material, while still shapeable, that is, before hardening, is easily converted into almost any shape desirable. Thus, the material is easily converted into a body or bodies of sheets, plates, firm and brittle pellets, bars, sticks, bricks, pipes, tubes, tapes, noodles, shells, fibre-like products, and spaghetti-like products etc., by means of methods known to a person skilled in the art, such as extrusion, casting, pressing, moulding, injection moulding, etc., optionally combined with or followed by evaporation and/or heating. An often preferred method is to extrude the material, while extrudable, into a multitude of strings of a cross-sectional dimension, such as diameter, of, e.g. 1–5 mm and chop the strings in short lengths, typically 3–30 mm such as 5–12 mm, to form pellets which are then hardened, typically by drying.

In a preferred embodiment the material is then stored in an atmosphere of at least 75% relative humidity, such as at least 80% relative humidity, preferably at least 85% relative humidity, even more preferably at least 90% relative humidity, such as at least 99% relative humidity, in order to pre-harden the material. Optionally, the material is then subjected to a final drying step in order to remove excess water.

In general, materials which exhibit a neutral pH when suspended in water are preferred. Thus, in a preferred embodiment the material (with or without storage under humid conditions) has a pH in the range of 5 to 9, such as in the range from 5.5 to 8.5, preferably in the range from 6 to 8, even more preferably in the range from 6.5 to 7.5, e.g. around 7, based on a 4 mg ground sample of the material suspended in 25 ml demineralised water. Macrostructures comprising several of the porous bodies, e.g., several pellets, may be produced from the dry pellets by "gluing" them together by means of an organic or inorganic (such as a cement slurry) in a manner known per se. In a particular embodiment, the same reaction mixture from which the bodies may be made by extrusion and chopping may be used in itself as an inorganic adhesive, optionally after dilution.

However, it is also possible to obtain the bodies as minute particles constituting a free-flowing powder by removing excess solvent water after the reaction has completed. Thus, instead of the above-mentioned processing (casting, extrusion, etc.) the excess water can, if necessary, be removed by filtration, evaporation, suction, autoclaving, etc., and the resulting material comprising fine particles can be dried by means of any standard procedure known to a person skilled in the art, including air-drying at ambient temperature and pressure.

It is envisaged that when producing the porous bodies in a continuous industrial process, it may be advantageous to supply at least part of the water as steam due to a decrease in the sliding friction of the reaction mixture.

In another interesting embodiment of the invention the the material from which the porous bodies are made is produced by a slightly modified process compared to the process described above. This process is particular suitable when the porous bodies comprise fibres, such as cellulose fibres.

Thus, by employing the above-mentioned slightly modified process the extrusion step may be avoided. In general, the slightly modified method comprises the following steps: The fibres are added to a silica slurry (preferably comprising from about 30% to 70% by weight of silica, preferably around 50% by weight) while stirring and, in the case of cellulose fibres, while blending the mixture in order to de-fibrate (or partly de-fibrate) the cellulose fibres until a thixotropic mass (viscous paste) is obtained. Stirring is then continued until a "dough-like" material is formed. If only a small amount of fibres (i.e. less than about 10–20% by weight) is employed it will normally be necessary to add perlite (typically from 10% to 70% by weight) in order to obtain the above-mentioned "dough-like" structure of the material.

After the "dough-like" structure is obtained a base such as $Ca(OH)_2$ or a cement is added under vigorous stirring whereby a workable mass will be obtained. By continuing stirring small grains are formed which will grow into small pellets if stirring is continued. Thus, it should be understood that the dimension of the pellets produced may be controlled by the stirring time after addition of the base (typically a cement). The diameter of the pellets produced will typically be in the range from about 1 to 8 mm. Preferably the materials produced as described above should be hardened by methods known to the person skilled in the art, such as hydraulic hardening for 28 days without draining the product; autoclaving; or hydraulic hardening in a closed, insulated box. Optionally, the material is then subjected to a final drying step in order to remove excess water.

The above method according to the invention has numerous possible applications. Thus, one application of the method according to the invention is the use of the method in ventilation systems e.g. such as in car parks, households, airports, hospital kitchens, garages, petrol stations, factories, warehouses, department stores, toilets, meeting rooms, hairdressing saloons, hotels, etc.

Another application within the scope of the invention is the use of the method in masks for adsorbing organic or inorganic chemicals which originate from e.g. paint, spray-painting, solvents, etc.

A third application within the scope of the invention is the use of the method in general environmental protection by adsorbing odorous and/or toxic substances from chimney smoke in industrial plants, such as chemical plants, power stations, etc.

A fourth application within the scope of the invention relates to the possibility of incorporating catalytically active materials into the pores of the material. Thus, the porous material may perform the function of a carrier.

Due to the general adsorption properties of the porous bodies, it is contemplated that they may also be ideally useful for removing waste substances from an aqueous medium.

Thus, the present invention also relates to a method for removing or reducing the concentration of waste substances from an aqueous medium, comprising passing the aqueous medium containing waste substances through a filter of a product comprising a porous body or porous bodies produced from a material made from components comprising ultra-fine silica, water, and a component enabling porosity-conferring binding of the material.

In the present context the term "waste substances" is intended to mean undesirable chemical substances commonly found in e.g. waste water, drinking water, ground water, etc.

Examples of waste substances are e.g. inorganic substances such as chromium, iron, cobalt, nickel, copper, zinc, cadmium, mercury, aluminium, lead, arsenic, etc. in any commonly found oxidation step, pesticides e.g. such as hexachlorocyclohexane, hexachlorobenzene, pentachlorophenol, 2,4,5-trichlorophenoxy acetate, hexachlorophen, dioxin, 2,3,7,8-tetrachlorodibenzo-p-dioxin (TCDD), polychlorinated biphenyl (PCB), dichlorodiphenyltrichlorethane (DDT), etc., and breakdown products thereof, polyaromatic hydrocarbons comprising from 10–22 carbon atoms such as naphthalene, anthracene, phenanthrene, dibenz[a,h]anthracene, benzo[a]pyrene, 7,12-dimethyl-benz[a]anthracene, etc., and smaller organic molecules commonly found in e.g. ground water and waste water such as acetaldehyde, acetic acid, acetic anhydride, acetone, acetylene, acrolein, acrylic acid, acrylonitrile, amines, amyl acetate, amyl alcohol, amyl ether, aniline, benzene, borane, butanone, butyl acetate, butyl alcohol, 2-butoxyethanol, butyl chloride, butyl ether, butylene, butyraldehyde, butyric acid, camphor, caprylic acid, carbolic acid, carbon tetrachloride, cellosolve, cellosolve acetate, chlorobenzene, chlorobutadiene, chloroform, chloronitropropane, chloropicrin, creosote, cresols, crotonaldehyde, cyclohexane, cyclohexanol, cyclohexanone, cyclohexene, decane, dibromoethane, dichlorobenzene, dichlorodifluoromethane, dichloroethane, dichloroethylene, dichloroethyl ether, dichloromonofluormethane, dichloronitroethane, dichloropropane, dichlorotetrafluoroethane, diethylamine, diethyl ketone, dimethylaniline, dimethylsulphate, dioxane, dipropyl ketone, ethers, ethyl acetate, ethyl acrylate, ethyl alcohol, ethyl amine, ethyl benzene, ethyl bromide, ethyl chloride, ethyl ether, ethyl formate, ethyl mercaptan, ethyl silicate, ethylene chlorhydrin, ethylene dichloride, ethylene oxide, eucalyptole, fluortrichloromethane, formaldehyde, formic acid, heptane, heptylene, hexane, hexylene, hexyne, cyanide, indole, iodoform, isophorone, isoprene, isopropyl acetate, isopropyl alcohol, isopropyl chloride, isopropyl ether, kerosene, lactic acid, menthol, mercaptans, methyl acetate, methyl acrylate, methyl alcohol, methyl bromide, methyl butyl ketone, methyl cellosolve, methyl cellosolve acetate, methyl chloride, methyl ether, methyl ethyl ketone, methyl formate, methyl isobutyl ketone, methyl mercaptan, methylcyclohexane, methylcyclohexanol, methylcyclohexanone, methylene chloride, monochlorobenzene, monofluorotrichlorometane, naphthalene, naphthziene, nicotine, nitro benzenes, nitroethane, nitroglycerine, nitrotoluene, nonane, octalene, octane, palmitic acid, paradichlorbenzene, pentane, pentanone, pentylene, pentyne, perchlorethylene, phenol, propionaldehyde, propionic acid, propyl acetate, propyl alcohol, propyl chloride, propyl ether, propyl mercaptan, putrescine, pyridine, styrene monomer, tetrachlorethane, tetrachloroethylene, toluene, toluidine, trichloethylene, trichlorethane, turpentine, urea, uric acid, valeric acid, valeric aldehyde, xylenes, etc,., and combinations thereof.

Also in this connection, the method of the invention is preferably adapted to reduce the content of the odorous substances to at the most 50% of its initial concentration, preferably to at the most 30% or better at the most 20%, such as at the most 10% or less. The reduction aimed at is often a substantially complete removal of the waste substances.

A further important use of the principles of the invention is a method for thixotroping bitumen, in particular bitumen used in road construction, in which method porous bodies of the type characterised herein are added to hot bitumen, and the bodies (and/or fragments thereof resulting from full or partial disintegration of the bodies) to be distributed in the bitumen. In this manner, the bitumen can be made sufficiently thixotropic to substantially avoid sedimentation of coarse aggregate such as gravel or stones in the road construction. As an example, runways in airports are preferably made with a high concentration of coarse aggregate part of which is to remain in the surface of the resulting runway to ensure sufficient friction; sedimentation of the aggregate would tend to remove aggregate from the surface. Presently, cellulose fibres are often used to confer thixotropy to bitumen to avoid sedimentation of coarse aggregate. The bodies used according to the invention have the advantage that they are inorganic and can be made "crunchy" and easy to distribute as such or predominantly in more or less disintegrated form (the disintegration being a result of agitation and attrition between particles of aggregate) to result in a high resistance to coarse aggregate sedimentation.

In a preferred embodiment the porous bodies are added to the coarse aggregate, e.g. dried warm stones and filler materials after which the resulting composition is mixed whereby the porous bodies are crushed. The hot low-viscosity bitumen is then added to the resulting coarse aggregate/porous body mixture so that the final concentration of the porous bodies in the asphalt is from 0.1–1% by weight, in particular 0.2–0.5% by weight, calculated on the bitumen. The temperature of the bitumen at the time of addition is normally in the range of 160–200° C., in particular 170–180° C. Typically, the bitumen and the coarse aggregate/porous body mixture is mixed from a few seconds to 5 min, preferably from 5 seconds to 1 min, even more preferably from 10 seconds to 30 seconds, such as from seconds to 20 seconds.

A particularly suitable type of bodies for this use are bodies made from ultra-fine silica present in an amount from 10 to 60% by weight, preferably from 20 to 50% by weight, such as from 30 to 40% by weight, water, present in an amount from 5 to 50% by weight, preferably from 10 to 40% by weight, such as from 20 to 30% by weight, and perlite, present in an amount from 10 to 60% by weight, preferably from 20 to 50% by weight, such as from 30 to 40% by weight, as the sole or main components.

The bodies are normally added to the bitumen in an amount of 0.1–1% by weight, in particular 0.2–0.5% by weight, calculated on the bitumen. The temperature of the bitumen at the time of addition of the bodies is normally in the range of 160–200° C., in particular 170–180° C.

A further aspect of the invention relates to a method for producing filter paper or filter cardboard from a cellulose fibre-containing pulp, comprising flocculating the pulp by adding ultra-fine silica to the pulp and reacting it in situ with a dissolved base, such as e.g. lime water or a polyelectrolyte.

As the porous materials are new the present invention also relates to a product comprising a porous body or porous bodies comprising silica, preferably ultra-fine silica and one or more bases.

In an interesting embodiment of the invention the product comprising the porous body or the porous bodies comprises at least 35% by weight of ultra-fine silica (calculated on the total weight of the product), preferably at least 40% by weight, such as at least 45% by weight, in particular at least 50% by weight and one or more bases.

The base (or bases) is preferably selected from the group consisting of $Ca(OH)_2$, cement and perlite and mixtures thereof.

Thus, in another interesting embodiment of the present invention the product comprising the porous body or the porous bodies comprises at least 35% by weight of ultra-fine silica (calculated on the total weight of the product), preferably at least 40% by weight, such as at least 45% by weight, in particular at least 50% by weight, perlite and/or cement. In a particular interesting embodiment of the invention the product comprising the porous body or the porous bodies further comprises a filler body selected from fibres and particles. Preferably the fibres are selected from cellulose fibres and/or mineral fibres. These fibres are typically present in an amount from 4% to 75% by weight, preferably 10% to about 50% by weight, in particular from 15% to about 35% by weight (calculated on the total weight of the product).

Description of FIG. 1:

Various raw materials (loose silica, densified silica, silica slurry, perlite, cements, wood flour, ground straw, etc.) are stored in silos 1 to 9. Depending on which particular product one wants to produce, the raw materials are dosed by opening the relevant silos 1 to 9. The raw materials are transported to the mixing machine 10 by means of the feed screw 11 driven by the engine 12. Raw chemicals are stored in tank 13 (surfactants), 14 (surfactants), and 15 (calcium chloride or another accelerator or retarder). Depending on which particular product one wants to produce, the raw chemicals are dosed by opening the relevant tanks 13 to 15. Water is added through the pipe 16 to the raw chemicals (if raw chemicals are employed) and the resulting mixture is mixed in the pre-mixer 17 after which the resulting mixture by means of the pump 18 is driven through the nozzles 19 and added to the raw materials in the mixing machine 10. The resulting "paste" or powder is then transported to a storage tank 20 by means of an elevator 21 wherein the "paste" or powder is stored for at the most 15 minutes, optionally for a shorter or longer period dependent on whether an accelerator or retarder is present. The "paste" or powder is then transported to the pre-press machine 22 by means of the feed screw 23 driven by the engine 24. After the pressing procedure, the material is granulated in a granulation machine 25, and then extruded in an extruder 26 optionally connected to a steam supply 27. The porous material is extruded into pellets with a diameter typically in the range from 2 to 5 mm, and is then via the conveyor belt 28 transported to a drying (or cooling) room 29 after which the porous material is passed through the sieve 30 and finally packed in bags 31 optionally equipped with an inner surface of plastic so that the porous material may continue the hardening process while stored.

EXAMPLES

All values are in grams (g) unless otherwise specified. % is percent by weight unless otherwise stated.

Silica slurry was obtained from Elkem Materials, Norway (Elkem Microsilica® slurry). The concentration of the slurry was 50% silica by weight.

Potassium methyl siliconate as a 42% aqueous solution (Wacker BS-15) was obtained from Wacker Chemie GmbH, Germay.

Potassium hydroxide pellets were obtained from Bie & Berntsen A/S, Denmark.

Sodium hydroxide pellets (Afløbsrens) were obtained from the grocery store.

Rockwool® Hulrumsfyld (mineral wool) and Glasuld® Hulrumsfyld (glass wool) from Ledreborg Tømmerhandel, Roskilde, Denmark.

Loose silica was obtained from Elkem Materials, Norway (Elkem Microsilica®).

Densified silica was obtained from Elkem Materials, Norway.

Sand-lime mortar was obtained from Dansk SystemMørtel A/S, Denmark.

Soda lye (27%) and soda water glass was obtained from Borup Kemi, Denmark.

Basic, rapid, ultra and white cements were obtained from Aalborg Portland, Denmark, and Hasle cement was obtained from Hasle Refractories, Denmark.

Perlite, with a mean particle size less than 14 $\mu$m, and less than 7 $\mu$m was obtained from Nordisk Perlite, Denmark (type 50 and type 180, respectively).

Wood flour (beech wood flour T 100) was obtained from Junckers Industries, Denmark.

Carboxy methyl cellulose (CMC powder, Arabin cellulose tapetklister) was obtained from De Carlske Fabrikker, Denmark.

Chopped paper (having a dimension of 9 mm×0.7 mm) was prepared from newspapers (having a weight per m² of less than 48) by cross-cutting the newspapers in a shredding machine (cross-cut).

Wheat fibres (Wheat fibre ID 48) was obtained from Cergy Pontoise Cedex, France.

Cotton fibres (Vegetable fibre isolate ID 99) was obtained from Cergy Pontoise Cedex, France.

Food Agar (Thixotropic Quick Soluble Agar D100) was obtained from Setexam, Usine El Assam, 14000 Kénitra, Morocco.

Non-ionic and cationic surfactants in the form of detergent (Vel Ultra Opvaskemiddel) was obtained from Colgate-Palmolive A/S, Denmark. According to the declaration of contents the product contains more than 30% of anionic surfactants, and less than 5% of non-ionic surfactants.

Cationic surfactants in the form of rinse aid (Net-Op) was obtained from Dansk Supermarked Indkøb A/S, Denmark. According to the declaration of contents the product contains 15–30% of cationic surfactants.

Activated carbon (type 207 E3, 3 mm pellets and type 207 E4, 4 mm pellets) was obtained from Sutcliffe Speakman Carbons Ltd, Lancashire, England. This product was employed in the "Oil absorption test".

Activated carbon (as a powder) was obtained from Sutcliffe Speakman Carbons Ltd, Lancashire, England. This product was employed in the porous materials.

Ground straw with a length of less than 5 $\mu$m was prepared in a hammer mill.

Polymer particles (Keydime S) were obtained from Eka Nobel Industries, Sweden.

The high-speed mixer used was a domestic handheld mixer (Braun Multiquick MR405, 4185).

The (low-speed) mixer used was a domestic mixer (Kenwood Major Classic KM800).

The microwave oven used was a domestic microwave oven (Gorenje Kombi 971 Kombiovn—effect 950W). The setting was 80% of the maximum effect unless otherwise stated.

A dehumidified used to reduce the relative humidity in the laboratory was a Westtherm Model DH 3212.

Binder Systems and Products Comprising the Same

General Procedure for the Preparation of the Binder Systems A–C, I–L and V–Y

The silica in the form of a 50% (w/w) slurry was added to a container. The potassium methyl siliconate (as a solution) and/or alkali metal hydroxide and additional water was added while stirring vigorously with a high-speed mixer (full power) for 10–15 min (applied energy was estimated to around 0.04 kWh/kg). For the binders, which all included an alkaline organosiliconate, a marked increase in the viscosity was first observed, however after approximately 10 min of mixing, the viscosity decreased to a creamy liquid. Without being bound to any specific theory, it is believed that this was due to the fact that the mixture was not optimally mixed in the beginning and that reaction between the silica and the alkaline siliconate had only taken place to a lesser extent. (It was important that the mixing was performed at high speed as the mixture of the silica and the alkaline siliconate would otherwise result in a partially gel-like product which was unsatisfactory for use as a binder.)

The constitution of each of the binder systems A–C, I–L and V–Y is shown in Table I.

TABLE I

| Binder No. | A | B | C | I | J | K | L |
|---|---|---|---|---|---|---|---|
| Silica slurry (50%) | 500 | 500 | 500 | 500 | 500 | 500 | 500 |
| Potassium methyl siliconate (42%) | 25 | 50 | 100 | | | | |
| Additional water | 25 | 50 | 100 | | | | |
| KOH solution: | | | | | | | |
| KOH (solid) | | | | | | 15 | 25 |
| Water | | | | | | 250 | 250 |

TABLE I-continued

NaOH solution:

|  | | |
|---|---|---|
| NaOH (solid) | 15 | 25 |
| Water | 250 | 250 |

| Binder No. | V | X | Z |
|---|---|---|---|
| Silica slurry (50%) | 500 | 500 | 500 |
| Potassium methyl siliconate (42%) | 10 | 10 | 10 |
| Additional water | 10 | 10 | 10 |
| KOH solution: | | | |
| KOH (solid) | 15 | | 10 |
| Water | 250 | | 175 |
| NaOH solution: | | | |
| NaOH (solid) | | 15 | 5 |
| Additional water | | 250 | 75 |

All of the binders A–C, I–L and V–Z had a viscosity corresponding to a creamy liquid.

Due to the increase in the amount of organosiliconate used, the hydrophobicity appeared to increase from binder A to C. This was observed as an increase in contact angle when a drop of water was added to a mineral wool product (a mineral wool material (Rockwool® Hulrumsfyld) onto which the water-based binder mixture was previously applied by brush, dried at around 50° C. and cured in a microwave oven). For binder A–C the contact angle was estimated to 90–110 with the highest contact angle for C.

The binders I–L were prepared as above and were estimated to have the same viscosity as for A–C. After storage for 1–50 days some gelling occurred and the viscosity consequently dramatically increased. The pH after storage was around 10–13. Materials wherein those binders were used appeared to be slightly more brittle than the one where either a siliconate or a mixture of a siliconate and base were used.

The binders V–Z showed properties in consistency with the ones mentioned above.

General Procedure for Application of the Binder Component to Fibre or Particle Materials The binder mixture was either brushed onto the material or the material was dipped in the binder mixture and pressed to remove excess binder (mineral wool) or mixed with the mineral particle material (sand). The materials with the binder were dried by evaporation of 80% of the excess water (estimated) by heating at around 50° C. and were cured in a domestic microwave oven (setting 70–80% intensity) for 5–8 minutes. The compositions are shown in Table II.

TABLE II

| Experiment No. | D | E | F | G | H | M | N |
|---|---|---|---|---|---|---|---|
| Binder: | | | | | | | |
| A | 50 | | | | | | |
| B | | 50 | | 225 | 200 | | 25 |
| C | | | 50 | | | | |
| I | | | | | | | 25 |
| J | | | | | | 50 | |
| Rockwool ® Hulrumsfyld | | | 150 | | | | |
| Sand | 350 | 350 | 350 | | | 350 | 350 |
| Perlite < 2 mm | | | | | 100 | | |

TABLE II-continued

| Experiment No. | O | P | Q | R | S | T | U |
|---|---|---|---|---|---|---|---|
| Binder: | | | | | | | |
| B | 100 | 100 | 100 | 100 | 100 | | 25 |
| I | 125 | | | | | | |
| J | | | 100 | | 100 | | |
| K | | 125 | | | | | 25 |
| L | | | | 100 | | 50 | |
| Rockwool ® Hulrumsfyld | 150 | 150 | | | | | |
| Sand | | | | | | 350 | 350 |
| Perlite < 2 mm | | | 100 | 100 | | | |
| Wood cellulose | | | | | 100 | | |

Experiments D–F resembles the binding between native vitreous fibres (non-surface treated) and the binder system. Even at a content of less than around 5% siliconate, the binding strength was satisfactory.

Experiment G shows the combination of a surface-treated vitreous fibre product and the binder. Regardless of the already surface-modified fibres, the binding strength between the binder system and the fibres was considered satisfactory.

The experiments M and N is a comparison between a binder system prepared with a base but without siliconate and a binder system with a base and a siliconate. The latter example provides a higher degree of hydrophobicity and furthermore a less "brittle" product.

The experiments O to S show various advantageous binder systems comprising a siliconate as well as a base.

The experiments T and U show comparative examples of a binder system comprising a a base exclusively and a siliconate and a base. The latter binder system showed a higher hydrophobicity when estimating the contact angle of a water drop (see above).

Preparation of Light, Porous Products

The products 91–100 relates to castings of micro-porous pellet products prepared exclusively from silica, cement and water. The aim of the experiment was to prepare a light, cheap, non-flammable, robust, casting insulating material from these materials and optionally mineral wool fibres as reinforcement, such material optionally being rendered hydrophobic by addition of siliconate. The products were prepared as follows: a cement slurry was prepared from ultra-fine cement and water (the finer cement the more satisfactory slurry) by vigorously mixing with a high speed mixer for 8 min (unless otherwise stated). The silica slurry and the cement slurry is then mixed vigorously for another 8 min. (unless otherwise stated) resulting in a relatively rigid egg-white foamy masse which cures at room temperature as concrete or porous concrete. Accelerators and retarders may be added. This very light foamy, porous product is remarkably in that essentially no shrinking occurs—even without additives. The important feature is to have the cement to react as a base to gel the silica slurry. This is effected under vigorous mixing. The more water added to the mixture, the lower the strength of the cured product. The most promising relation between silica and cement is 75:25–50:50 by weight.

Products 101–106 are prepared essentially as above, where the silica:cement ratio is 80:20–68:32, but with Rockwool® Hulrumsfyld as a mineral fibre. The aim was to lower the density without increasing the quality (strength) of the pellets. Lower densities were obtained by also a slight decrease in strength.

Products 107–111 relates to pellet products with Glass wool as mineral fibre. The water content and the cement type is varied and some products comprise active carbon. Having about the same densities as the previous products in this series, the best product (homogenity) was obtained with Glass wool.

TABLE III

| Product No. | 91 | 92 | 93 | 94 | 95 | 96 | 97 | 98 |
|---|---|---|---|---|---|---|---|---|
| Silica slurry (50%) | 1000 | 1000 | 1000 | 1000 | 1000 | 1000 | 1000 | 1000 |
| Additional water | 500 | 400 | 250 | 200 | 400 | 400 | 400 | 400 |
| Rapid cement | 250 | 200 | 125 | 100 | 75 | 250 | 200 | 125 |
| pH after 28 days | 12 | 11–12 | 10 | 9–10 | 9 | 12 | 11–12 | 10 |

| Product No. | 99 | 100 | 101 | 102 | 103 | 104 | 105 | 106 |
|---|---|---|---|---|---|---|---|---|
| Silica slurry (50%) | 1000 | 1000 | 1000 | 1000 | 1000 | 1000 | 1000 | 1000 |
| Additional water | 400 | 400 | 400 | 400 | 400 | 1200 | 1200 | 1200 |
| Rockwool ® Hulrumsfyld | | | 500 | 400 | 600 | 1200 | 800 | 800 |
| Rapid cement | 100 | 75 | 100 | 100 | 100 | 100 | 160 | 100 |
| pH after 28 days | 9–10 | 9 | | | | | | |
| Mixing time, min. | | | 10 | 8 | 9 | 10 | 12 | 10 |
| Bulk density kg/m³ | | | 339 | 325 | 333 | 334 | 256 | 273 |

| Product No. | 107 | 108 | 109 | 110 | 111 |
|---|---|---|---|---|---|
| Silica slurry (50%) | 1200 | 1200 | 1200 | 1200 | 1200 |
| Additional water | 400 | 500 | 500 | 500 | 500 |
| Carbon powder 850 m²/g | | | 120 | 300 | 300 |
| Rockwool ® Hulrumsfyld | | | 500 | 400 | 600 |
| Glasuld ® Hulrumsfyld | 480 | 480 | 480 | 480 | 480 |
| Rapid cement | 120 | 120 | 120 | 120 | |
| Ultra cement | | | | | 120 |
| Mixing time, min. | 9 | 9 | 9 | 9 | 10 |
| Bulk density kg/m³ | 328 | 332 | 343 | 371 | 385 |

Other Binders Systems and Products Comprising the Binder Systems (114–118)

Composition 112 is a hydrophobic binder system and 113 is a product in the form of pellet or alternatively a sheet comprising Rockwool® Hulrumsfyld using the binder system of 112 which was dried and cured for 6 min. in the microwave oven for 6 min. 114 is a hydrophobic binder system which is used in the products 115–118. 115 are sheets of Rockwool® "glued" together with the binder; dried and cured in a microwave oven for 10 min. (70% effect). 116 and 117 are hydrophobic pellet, and 118 is a sheet prepared from the binder system 114 and Rockwool® Hulrumsfyld; dried and cured in a microwave oven for 12 min. (70% effect)+5 min. (80% effect). The compositions are as shown in Table IV. All products and compositions were hydrophobic due to the content of the potassium methyl siliconate.

TABLE IV

| Composition No. | 112 | 113 | 114 | 115 | 116 | 117 | 118 |
|---|---|---|---|---|---|---|---|
| Silica slurry (50%) | 500 | | 1000 | 1000 | | | |
| Additional water | | | 500 | 500 | | | |
| Rockwool ® Hulrumsfyld | | 100 | | | | | 750 |
| Glasuld ® Hulrumsfyld | | | | | 525 | 420 | |
| Potassium methyl siliconate (42%) | 10 | | 30 | 40 | | | |
| Composition No. 112 | | 200 | | | | | |
| Composition No. 113 | | | | | 1230 | 1230 | 1236 |
| Bulk density kg/m³ | | 292 | | | 364 | 325 | |
| Mixing time | 10 | | | | 10 | 10 | 10 |

The compositions 119–124 relate to products useful for dispersable fibres for easy distribution to, e.g., asphalt, paints, plastics, cement, gypsum, products for oil- and chemicals absorption. The silica slurry and the cationic surfactant were vigorously mixed with the high speed mixer for 5–10 min. This mixture was mixed with the fibre material in the Kenwood mixer for 5–8 min. The compositions are shown in Table V. All compositions were hydrophobic and easily dispersable. See Table V:

| Composition No. | 119 | 120 | 121 | 122 | 123 | 124 |
|---|---|---|---|---|---|---|
| Silica slurry (50%) | 1200 | 1200 | 1200 | 1200 | 1200 | 1200 |
| Additional water | | | | | 200 | 300 |
| Cationic surfactant | 30 | 60 | 60 | 60 | 60 | 60 |
| Rockwool ® Hulrumsfyld | 1200 | | 1200 | 600 | | |
| Glasuld ® Hulrumsfyld | | 900 | | | | |
| Chopped paper (cellulose fibres) | | | | | 600 | 650 |
| Bulk density kg/m³ | 426 | 356 | 410 | 425 | 271 | 270 |
| Mixing time (silica/cat.) | 10 | 12 | 12 | 8 | 12 | 15 |

Compositions 127–134 are further examples utilising the same procedure as for compositions 119–124. Compositions 127 and 128 (fine pellets) may be useful as growth substrate. Compositions 130 (thick paste formed into a hydrophobic sheet) and 131 (as 130 by the viscosity was dramatically decreased upon addition of the siliconate) illustrate a hydrophilic and hydrophobic binder system variant, respectively. Compositions 132–133 (thick pastes after 24 h) also illustrate hydrophilic binder systems. Composition 134 (thick paste before addition of siliconate, then a creamy mass) is a hydrophobic binder product. The silica slurry was vigorously mixed for 10 min. whereby a highly viscous mass was obtained. After storage for 1 day at room temperature, the viscous mass was vigorously mixed with potassium methyl siliconate for 10 min. Afterwards, the resulting hydrophobic binder system and the fibres were mixed in the Kenwood mixer for 9 min. The product appeared in the form of pellet which were pressed and formed into a sheet. The compositions are shown in Table VI.

TABLE VI

| Composition No. | 127 | 128 | 129 | 130 | 131 | 132 | 133 | 134 |
|---|---|---|---|---|---|---|---|---|
| Silica slurry (50%) | 1200 | 300 | 300 | 300 | 300 | 300 | 300 | 300 |
| Additional water | 1200 | 300 | 300 | | | | | |
| Ca(OH)$_2$ (38%) | 60 | 30 | 30 | 30 | 30 | | | |
| KOH | | | | | | 15 | 30 | 30 |
| Additional water | | 300 | 300 | 300 | 300 | 135 | 300 | 300 |
| Rockwool® Hulrumsfyld | 1200 | 300 | 300 | | | | | 300 |
| Potassium methyl siliconate (42%) | | | 30 | | 30 | | | 30 |
| Bulk density kg/m$^3$ | 383 | 342 | 383 | 285 | 271 | | | 270 |
| pH | 8 | 11 | | 10 | 10 | 10 | 11 | 11 |

Testing of Binder Systems to Evaluate the Binding Strength Towards Shots with Mineral Fibre Compositions (Grit Bar Test)

Shots of mineral fibres having a diameter of 0.25–0.50 mm can be used to make bars with dimensions 140 mm×25 mm×10 mm. In order to prepare the bars, 100 ml water-based binder mixture with 15% solids content is sprayed onto and mixed with 450 g shots. The used amount of shots is sufficient to prepare 8 bars. The bars are cured at 90° C. for 2 hours.

Four of the bars are broken directly (dry strength), the other four bars are place in 80° C. water for 3 hours before they are broken (wet strength).

Binding strength is determined by breaking the bars in a standardised measuring device where the clamping length is 100 mm and the velocity of the compressing beam is 10 mm/min. Using the clamping length and the width and thickness of the bars, the binding strength can be determined in N/mm$^2$.

It is expected that the dry binding strength of the mineral fibre products of the present invention is at least 4 N/mm$^2$, such as at least 6 N/mm$^2$, in particular at least 8 N/mm$^2$, and that the wet binding strength is at least 1 N/mm$^2$, such as at least 2 N/mm$^2$, in particular at least 3 N/mm$^2$. Thus, particularly interesting embodiments of the present invention relates to mineral fibre products having those strength characteristics.

Porous Materials
Preparation of Porous Materials 1–45

The porous materials 1–45 were prepared by mixing the individual components mentioned in Table 1 into a paste or a slightly wet powder while stirred. The stirring was continued until a workable powder substance was obtained, or the stirring was continued for at the most 15 min, and the resulting material was then 1) extruded and made into pellets with a diameter of 3 or 4 mm, or 2) pressed into sheets, after which the pellets or sheets were allowed to harden in an atmosphere of about 90% relative humidity (e.g. by covering the pellets or sheets by plastic film) for 14–28 days and subsequently drying the pellets or sheets.

The pH values shown in Table 1 were determined using the following method: After storage for 28 days in an atmosphere of about 90% relative humidity, the material was ground in a mortar and 4 mg was poured into 25 ml demineralised water with stirring. Stirring was continued for 6 minutes after which the pH was determined.

The detailed composition of each product is specified in Table 1 below.

Preparation of Porous Materials 46–56

The porous materials 46–56 were prepared by mixing the silica slurry (50% w/w) with the fibres while stirring until a viscous paste was formed. Perlite was then added while stirring until the texture of the material was "dough-like". Cement was added under vigorous stirring whereby a workable mass was obtained within a few minutes.

Continuing the stirring for 5–20 minutes resulted in formation of small individual pellets having a diameter in the range from about 1 to 8 mm depending on the actual stirring time.

The pellets were then allowed to harden (hydraulic hardening) in an atmosphere of 100% relative humidity (e.g. by covering the pellets by plastic film) for 28 days and subsequently drying of the pellets.

The pH values shown in Table 2 were determined using the following method: After storage for 28 days in an atmosphere of about 100% relative humidity, the material was grounded in a mortar and 4 mg was poured into 25 ml demineralised water with stirring. Stirring was continued for 6 minutes after which the pH was determined.

The detailed composition of each of the products 46–56 is specified in Table 2 below.

Preparation of Porous Materials 57–60 and 63–76 and 83–90

The porous materials 57–60 and 63–76 and 83–90 were prepared as described above (i.e. as described for the materials 46–56) except that perlite was not added. The detailed composition of each of the products 57–60 and 63–76 and 83–90 is specified in Table 2 below.

The compositions 83–87 (pellets) are derived from silica slurry, additional water and rapid cement (around 20% by weight of the silica) and various amounts of Rockwool® Hulrumsfyld. The aim with the compositions was to prepare a cheap, well-formed, light, non-inflammable, robust pellet prepared from as little binder and excess water as possible. These pellets could be used as constituents in the preparation of concrete and in other matrices, for the filtration of liquids, e.g. water, but also greasy substances in air, in particular kitchen ventilation air and diesel exhaust from motors. The slurry and additional water and fibres were mixed in a Kenwood mixer to a homogenous, heterogenous mass, whereafter the cement was added under continued mixing. After a short time of mixing a clear agglomeration was observed (granule formation). The time and amount of water determines the uniformity and size of the pellets.

The composition 88 is a pellet as above, but improved by addition of active carbon in powder form with the aim of removal of odorous substances.

The compositions 89 and 90 are similar pellets where Rockwool Hulrumsfyld is replaced by Glasswool Hulrumsfyld. These pellets are apparently less dense (fibres without pearls).

Preparation of Porous Materials 61 and 62

The porous materials 61 and 62 were prepared as described above (i.e. as described for the materials 46–56) except that cement was not added. Furthermore, the materials were not hardened by a hydraulic process but were fixed (cured) by drying. The detailed composition of each of the products 61 and 62 is specified in Table 2 below.

Most of the porous materials (1–62) were subjected to two different qualitative tests, the "Water absorption test" and the "Oil absorption" test, as described below.

Furthermore, most of the materials were qualitatively characterised by their swelling properties in water, their insolubility in water, and their anti-dust properties.

Water Absorption Test

About 5 g of the porous material (or activated carbon) was weighed out and added to approximately 250 ml of water. It is believed that as long as the material absorb the liquid small bubbles of air will develop due to displacement of air in the pores of the materials. Thus, the time until gas generation ceased was noted, and was taken as a qualitative measure of the adsorption capacity of the material in question.

Oil Absorption Test

About 2 g of white vaseline oil or vegetable oil was poured out on a piece of foil. Approximately 5 g of the material (or activated carbon) was added and the time until the oil was completely absorbed was noted, and was taken as a qualitative measure of the adsorption capacity as well as the affinity for hydrophobic molecules.

TABLE 1

| Product No. | 1 | 2 | 3 | 4 | 5 | 6 |
|---|---|---|---|---|---|---|
| Dens. silica | 500 | 490 | 480 | 462 | 450 | 350 |
| Lime water (1%) | 200 | | | | | |
| Lime water (38%) | | 25 | 50 | 100 | 150 | |
| Sand-lime mortar | | | | | | 150 |
| Tap water | | 235 | 220 | 188 | 150 | 75 |
| Diameter (mm), pellet | 3 | 3 | 3 | 3 | 3 | 3 |
| pH | 7.5–8 | 7.5–8 | 7.5–8 | 7.5–8 | 8.5–9 | 8.5–9 |

| Product No. | 7 | 8 | 9 | 10 | 11 | 12 |
|---|---|---|---|---|---|---|
| Loose silica | | | | 325 | 300 | |
| Dens. silica | 450 | 425 | | | | 450 |
| Silica slurry | | | 500 | | | |
| Slaked lime powder | 50 | 75 | 150 | | | |
| Basic cement | | | | 163 | 190 | |
| Rapid cement | | | | | | 50 |
| Tap water | 250 | 250 | | 325 | 300 | 250 |
| CMC powder | | | | 12 | 10 | 6 |
| Non-ionic and anionic surfactants | | | | | | 6 |
| Diameter (mm), pellet | 3 | 3 | | 4 | 4 | 3 |
| Sheet | | | X | | | |
| pH | 8–8.5 | 8–8.5 | 12 | 8.5–9 | 8.5–9 | 7.5–8 |

| Product No. | 13 | 14 | 15 | 16 | 17 | 18 |
|---|---|---|---|---|---|---|
| Loose silica | | 240 | 220 | 220 | 250 | 250 |
| Dens. silica | 450 | | | | | |
| Rapid cement | 50 | 120 | 110 | 100 | 125 | 125 |
| Tap water | 250 | 240 | 220 | 220 | 250 | 250 |
| Perlite < 7 μm | | 140 | 170 | | | 125 |
| Perlite < 14 μm | | | | 180 | | |
| Wood flour | | | | | 125 | |
| CMC powder | 5 | | | | | |
| Non-ionic and anionic surfactants | 3 | | | | | |
| Diameter (mm), pellet | 3 | 3 | 3 | 3 | 3 | 3 |
| pH | 7.5–8 | 7.5–8 | 7.5–8 | 7.5–8 | 9–9.5 | 7.5–8 |

| Product No. | 19 | 20 | 21 | 22 | 23 | 24 |
|---|---|---|---|---|---|---|
| Loose silica | 99 | | | | | |
| Dens. silica | | 350 | 425 | 100 | 180 | 225 |
| Silica slurry | 342 | | | | | |
| White cement | 50 | 50 | 75 | 50 | 50 | 50 |
| Tap water | | 260 | 200 | 184 | 194 | 175 |
| Perlite < 7 μm | | | | | 270 | |
| Perlite < 14 μm | 180 | | | 350 | | 225 |
| Cryst. cellul. powder | | 100 | | | | |
| Non-ionic and anionic surfactants | 6 | 6 | 15 | 6 | 6 | 6 |
| Diameter (mm), pellet | 3 | 3 | 3 | 3 | 3 | 3 |
| pH | 7.5–8 | 7.5–8 | 7.5–8 | 7.5–8 | 7.5–8 | 7.5–8 |

TABLE 1-continued

| Product No. | 25 | 26 | 27 | 28 | 29 | 30 |
|---|---|---|---|---|---|---|
| Loose silica | | 500 | | | 500 | |
| Dens. silica | 225 | | 425 | 450 | | 483 |
| Lime water (1%) | | | | 225 | | |
| Soda lye (27%) | | | | | 60 | 62 |
| Soda water glass | | 25 | | | | |
| White cement | 50 | | 75 | | | |
| Hasle cement | | | | 50 | | |
| Tap water | 160 | 225 | 250 | | 260 | 130 |
| Perlite < 14 μm | 225 | | | | | |
| CMC powder | | | 3 | | | |
| Non-ionic and anionic surfactants | 6 | | 10 | | | |
| Cat. surfact. (15%) | | | | | | |
| Diameter (mm), pellet | 3 | 4 | | 3 | 3 | 3 |
| Sheet | | | X | | | |
| pH | 7.5–8 | 9 | 7.5–8 | 7 | 9–9.5 | 9–9.5 |

| Product No. | 31 | 32 | 33 | 34 | 35 | 36 |
|---|---|---|---|---|---|---|
| Loose silica | 500 | | | | | |
| Dens. silica | | 500 | 500 | 500 | 300 | 250 |
| Soda lye (27%) | 25 | 28 | | | | |
| tap water | 200 | 175 | | 170 | 150 | 140 |
| Perlite < 14 μm | | | | | 200 | 250 |
| Non-ionic and anionic surfactants | | | | | 6 | 6 |
| Cat. surfact. (15%) | | | 185 | 10 | | |
| Diameter (mm), pellet | 3 | 3 | 3 | 3 | 3 | 3 |
| pH | 8.5–9 | 8.5–9 | 7–7.5 | 7–7.5 | 7.5–8 | 7.5–8 |

| Product No. | 37 | 38 | 39 | 40 | 41 | 42 | 43 |
|---|---|---|---|---|---|---|---|
| Loose silica | | 250 | 250 | | | | 250 |
| Dens. silica | 250 | | | | | 450 | |
| Lime water (1%) | | | | | | | 5 l. |
| Lime water (38%) | | | | 400 | | | |
| Lime water (42%) | | | | | | | |
| Slaked lime powder | | | | 100 | | 50 | |
| Tap water | 140 | 275 | 335 | | 250 | 200 | 20 l. |
| Perlite < 14 μm | 250 | | | | | | |
| Cellulose fibres | | | | | | | 250 |
| Ground straw < 5 μm | | 250 | 250 | | 250 | | |
| Polymer particles | | | | 15 | | | |
| Non-ionic and anionic surfactants | 6 | | | | | | |
| Diameter (mm), pellet | 3 | 3 | 3 | 3 | 4 | | |
| Sheet | | | | | | X | |
| pH | 7–7.5 | 6.5–7 | 7 | 11–12 | 7 | 12 | 7.5–8 |

| Product No. | | | | | | 44 | 45 |
|---|---|---|---|---|---|---|---|
| Loose silica | | | | | | | 500 |
| Dens. silica | | | | | | 250 | |
| Tap water | | | | | | 167 | 190 |
| Perlite < 7 μm | | | | | | 250 | |
| White vaseline oil | | | | | | | 10 |
| Non-ionic and anionic surfactants | | | | | | | 10 |
| Diameter (mm), pellet | | | | | | 4 | 3 |
| pH | | | | | | 7–7.5 | 7–7.5 |

*burned in a gas flame for 20 min.
**75 g ethanol (93%) was added.

TABLE 2

| Product No. | 46 | 47 | 48 | 49 | 50 | 51 | 52 |
|---|---|---|---|---|---|---|---|
| Silica slurry (50%) | 1100 | 1100 | 1100 | 1100 | 1000 | 1000 | 1100 |
| Wheat fibre (cellulose fibres) | | | 75 | 85 | | | |

TABLE 2-continued

| | | | | | | | |
|---|---|---|---|---|---|---|---|
| Cotton fibres (cellulose fibres) | 50 | 85 | | | | | |
| Rockwool ® granules | | | | | 250 | 250 | |
| Micro glass fibre | | | | | | | 150 |
| Rapid cement | 100 | 100 | 100 | 100 | 100 | 100 | 100 |
| Perlite < 7 μm | 350 | 300 | 300 | 300 | | 300 | 300 |
| Perlite < 14 μm | | | | | 300 | | |

| Product No. | 53 | 54 | 55 | 56 | 57 | 58 | 59 |
|---|---|---|---|---|---|---|---|
| Silica slurry (50%) | 1100 | 1100 | 1100 | 1200 | 1440 | 1440 | 1332 |
| Tap water | | | | | 180 | | |
| Chopped paper (cellulose fibres) | | | | 70 | 180 | 200 | 240 |
| Xotton fibres (cellulose fibres) | 75 | 75 | | | | | |
| QSA D100 Food Agar (cellulose fibres) | | | 90 | | | | |
| Ultra cement | | 100 | | | | | |
| Rapid cement | | | 100 | 100 | 100 | 80 | 94 |
| White cement | 100 | | | | | | |
| Active carbon | 100 | 100 | | | | | |
| Perlite < 7 μm | 200 | 200 | 300 | 100 | | | |
| Perlite < 14 μm | | | | 130 | | | |
| pH | | | | | 8–9 | 8–9 | 8–9 |

| Product No. | 60 | 61 | 62 | 63 | 64 | 65 | 66 |
|---|---|---|---|---|---|---|---|
| Silica slurry (50%) | 1200 | 1000 | 1000 | 1200 | 1200 | 1200 | 1200 |
| Tap water | 400 | 300 | 300 | | | | |
| Chopped paper (cellulose fibres) | 300 | 600 | | | | | 60 |
| SMP SR 80 (cellulose fibres) | | | | 60 | 60 | 60 | |
| Rapid cement | 100 | | | 90 | 90 | 90 | 90 |
| Active carbon | | | | 150 | 250 | 50 | |
| Perlite < 7 μm | | | | 100 | | 200 | 250 |
| Perlite < 14 μm | | | 700 | | | | |
| pH | 8–9 | | | | | | |
| Bulk density kg/m³ | | | | 423 | 417 | 437 | 447 |
| Water absorption % (w/w) | | | | 33 | 28 | 37 | 35 |
| Surface area m²/g | | | | 192 | 292 | 88 | 34 |
| Evaluation of pellets* | | | | 2 | 3 | 4 | 3 |

| Product No. | 67 | 68 | 69 | 70 | 71 | 72 |
|---|---|---|---|---|---|---|
| Silica slurry (50%) | 1200 | 1420 | 1200 | 1300 | 1200 | 1100 |
| Tap water | 100 | | 100 | | | |
| Chopped paper (cellulose fibres) | | 200 | | | | |
| SMP SR 80 (cellulose fibres) | 80 | | 100 | 80 | | |
| Cotton fibres (cellulose fibres) | | | | | 80 | |
| Rapid cement | 90 | 90 | 90 | 90 | 90 | 90 |
| Perlite < 7 μm | 250 | | 210 | 180 | 280 | |
| Perlite 0–3 mm | | | | | | 260 |
| Bulk density kg/m³ | 441 | 409 | 413 | 410 | 436 | 416 |
| Water absorption % | 40 | 38 | 37 | 35 | 34 | 31 |
| Surface area m²/g | 39 | 43 | 43 | 38 | 37 | 39 |
| Evaluation of pellets | 2 | 3 | 4 | 3 | 2 | 3 |

| Product No. | 73 | 74 | 75 | 76 |
|---|---|---|---|---|
| Silica slurry (50%) | | 1200 | 1200 | 1200 | 1250 |
| SMP SR 80 (cellulose fibres) | 60 | | | 70 |
| Acrylic fibres 2 mm | | | 52 | |
| FDE Plast fibres 940T | | 70 | | |
| Rapid cement | 90 | 90 | 90 | 80 |
| Perlite 0–3 mm | 150 | 240 | 340 | 150 |
| Bulk density kg/m³ | 433 | 399 | 427 | 439 |
| Water absorption % | 36 | 30 | 34 | 36 |
| Surface area m²/g | 135 | 31 | 35 | 128 |
| Evaluation of pellets | 4 | 3 | 2 | 4 |

TABLE 2-continued

| Product No. | 83 | 84 | 85 | 86 | 87 | 88 | 89 | 90 |
|---|---|---|---|---|---|---|---|---|
| Silica slurry (50%) | 1000 | 1000 | 1000 | 800 | 910 | 910 | 910 | 1000 |
| Tap water | 200 | 200 | 200 | 300 | 244 | 244 | 244 | 200 |
| Carbon powder 850 m²/g | | | | | | 50 | | |
| Rockwool ® Hulrumsfyld | 400 | 480 | 500 | 520 | 455 | 405 | | |
| Glasuld ® Hulrumsfyld | | | | | | | 455 | 400 |
| Rapid cement | 100 | 100 | 100 | 80 | 91 | 91 | 91 | 100 |
| Bulk density kg/m³ | 375 | 399 | 386 | 351 | 373 | 378 | 330 | 333 |
| Mixing time | 7 | 8 | 8 | 8 | 8 | 8 | 12 | 9 |
| Evaluation of pellets | | | | | 3 | 4 | 4 | 4 |

*1 poor, 2 fair, 3 good, 4 excellent

Discussion and Conclusion

In general the materials produced as shown in the examples herein exhibited absorption properties which were superior to activated carbon. The materials produced from ultra-fine silica, water, and cement or calcium hydroxide were especially efficient as they absorbed oil much faster than activated carbon when subjected to the "Oil absorption test". This effect was further enhanced when the material also comprised perlite and, in particular, when the material also comprised cellulose fibres. The above conclusion also holds true for the evaluation based on the "Water absorption test", where it was found that the materials produced from ultra-fine silica, water and cement or calcium hydroxide continued to evolve air-bubbles, in many cases for about 24 hours, whereas air-evolution ceased within 0.5 to 1 hour in the case of activated carbon.

Thus, based on the above-mentioned test, the materials produced from ultra-fine silica, water, and calcium hydroxide or cement, and/or perlite, and/or cellulose fibres exhibited a greater absorbing capacity than activated carbon.

Furthermore, the materials were easy to handle without producing dust. They did not easily break up, and most of the materials, especially those produced from ultra-fine silica, water, and calcium hydroxide, and/or perlite, and/or cement, were stable in water, i.e. when subjected to the "Water absorption test" the aqueous phase did not become turbid even after standing for 24 hours. An additional advantage of the materials is that they are incapable to swell in an aqueous solution. Thus, when applied to the "Water absorption test" no swelling was observed even when standing for 24 hours.

What is claimed is:

1. A porous mineral fibre/particle product comprising mineral fibres and/or mineral particles and a binder, said binder comprising a mixture of amorphous silica and one or more bases and water, and optionally one or more additives, said porous mineral fibre/particle product having a bulk density in the range of from about 300 kg/m³ to about 700 kg/m³.

2. The porous mineral product according to claim 1, wherein the binder comprises a mixture of amorphous silica, and at least one of
   (a) an alkali metal organosiliconate and
   (b) a base.

3. The porous mineral product according to claim 2, wherein the binder comprises an alkali metal organosiliconate.

4. The porous mineral product according to claim 2, wherein the base is selected from the group consisting of alkali or alkaline earth metal hydroxides, alkali or alkaline earth metal silicates, aluminium silicates, iron(II) and iron (III) silicates and mixtures thereof, alkali or alkaline earth metal pyrosilicates, aluminium pyrosilicates, iron(II) and iron(III) pyrosilicates and mixtures thereof, alkali or alkaline earth metal carbonates, alkali or alkaline earth metal bicarbonates, alkali or alkaline earth metal phosphates, alkali or alkaline earth metal pyrophosphates, ammonia, organic amines, and cements, and combinations thereof.

5. The porous mineral product according to claim 4, wherein the base is selected from the group consisting of alkali metal hydroxides, alkaline earth metal hydroxides and cements.

6. A method for preparing a porous mineral fibre/particle product comprising mineral fibres and/or mineral particles and a binder, said porous mineral fibre/particle product having a bulk density in the range from about 300 kg/m$^3$ to about 700 kg/m$^3$, the method comprising the steps of:
  preparing a binder by mixing an aqueous slurry of the amorphous silica, one or more bases, and optionally additives,
  applying the binder to the mineral fibres and/or mineral particles,
  compacting the mixture of the binder and the mineral fibres and/or mineral particles, and curing and drying the binder to obtain the mineral fibre/particle product.

7. The method according to claim 6, wherein the binder comprises a mixture of amorphous silica and at least one of (a) an alkali metal organosiliconate and (b) a base, and optionally additives.

8. The porous mineral product according to claim 1, wherein the mineral fibres and mineral particles are selected from the group consisting of volcanic rock fibres, wollastonite fibres, montmorillonite fibres, tobermorite fibres, biotite fibres, atapulgite fibres, calcined bauxite fibres, mineral wool, whiskers, sand, expanded clay, wollastonite, perlite, ceramic fibres, loose fill lightweight expanded clay aggregate, man-made vitreous fibres, glass fibres, and inorganic fillers.

9. The porous mineral product according to claim 8, wherein the glass fibres are selected from the group consisting of micro glass fibres, mineral wool fibres, processed mineral fibres from mineral wool, silicon-containing fibres, metal fibres, oxide fibres, and carbon fibres.

10. The porous mineral product according to claim 8, wherein the inorganic fillers are selected from the group consisting of ground quartz, silica gel particles, heavy spar, bentonite, diatomite, dolomite, feldspar, kaolin, spherical and hollow particles, carbon particles, talc, mica, vermiculite, kiselguhr, aluminium silicate, chalk, and fly ash.

11. The porous mineral product according to claim 1, which further comprises organic fibres selected from the group consisting of aromatic polyamide fibres, aromatic polyester fibres, aromatic polyimide fibres, cellulose fibres, cotton fibres, flax fibres, rubber fibres, fibres of derivatives of rubber, and polyolefin fibres.

12. The porous mineral product according to claim 11, wherein the polyolefin fibres are selected from the group consisting of polyethylene and polypropylene fibres, polyacetylene fibres, polyester fibres, acrylic fibres, modified acrylic fibres, acrylonitrile fibres, elastomeric fibres, protein fibres, alginate fibres, poly(ethylene terephthalate) fibres, polyvinyl alcohol fibres, aliphatic polyamide fibres, polyvinylchloride fibres, polyurethane fibres, vinyl polymeric fibres, and viscous fibres.

13. The porous mineral product according to claim 5, wherein the alkali metal hydroxide is selected from the group consisting of sodium hydroxide, potassium hydroxide and calcium hydroxide.

* * * * *